United States Patent

[11] 3,553,479

| [72] | Inventor | Dale H. Nelson<br>Box 395, Purchase, N.Y. 10577 |
|---|---|---|
| [21] | Appl. No. | 758,511 |
| [22] | Filed | Sept. 9, 1968 |
| [45] | Patented | Jan. 5, 1971 |

[54] ELECTRICAL ENERGY CONVERSION BY SWITCHING OF STATIC STORAGE DEVICES
10 Claims, 25 Drawing Figs.

| [52] | U.S. Cl. | 307/110,<br>307/246 |
|---|---|---|
| [51] | Int. Cl. | H02m 3/18,<br>H03k 17/66 |
| [50] | Field of Search | 307/110;<br>320/1; 321/15; 307/246 |

[56] References Cited
UNITED STATES PATENTS

| 2,773,200 | 12/1956 | Guggi | 307/110 |
| 3,371,232 | 2/1968 | Hannan et al. | 320/1X |

*Primary Examiner*—Terrell W. Fears
*Attorney*—Woodcock, Washburn, Kurtz & Mackiewicz ABSTRACT: In electrical conversion systems, storage devices are selectively switched between charging and discharging states. Transistor switches are connected between the storage devices and cyclicly connect them in series. Other transistor switches and rectifiers connect the storage devices in parallel, alternating with the series connection. There is a common connection between either polarity of the input and either polarity of the output. The basic circuit is adaptable for use in various combinations to provide conversions of a complex nature and to provide a capability of a variety of types of conversion with the basic circuit.

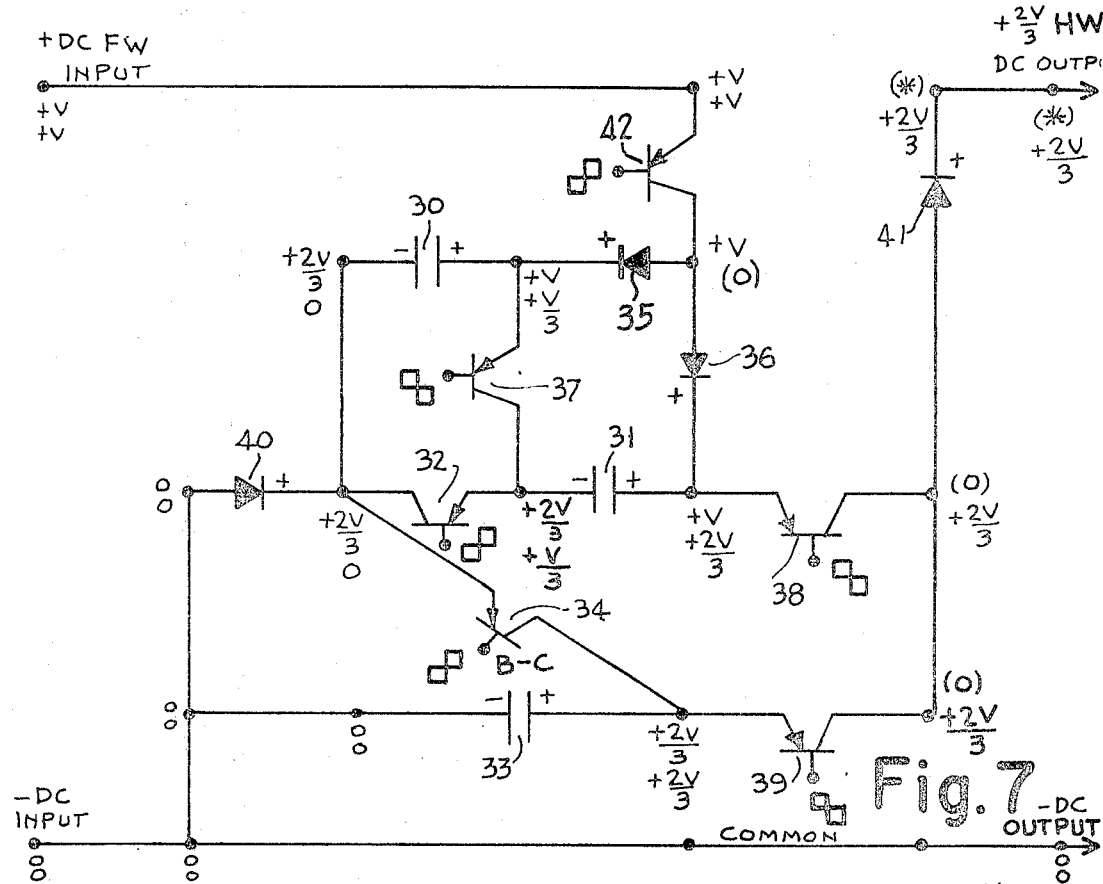
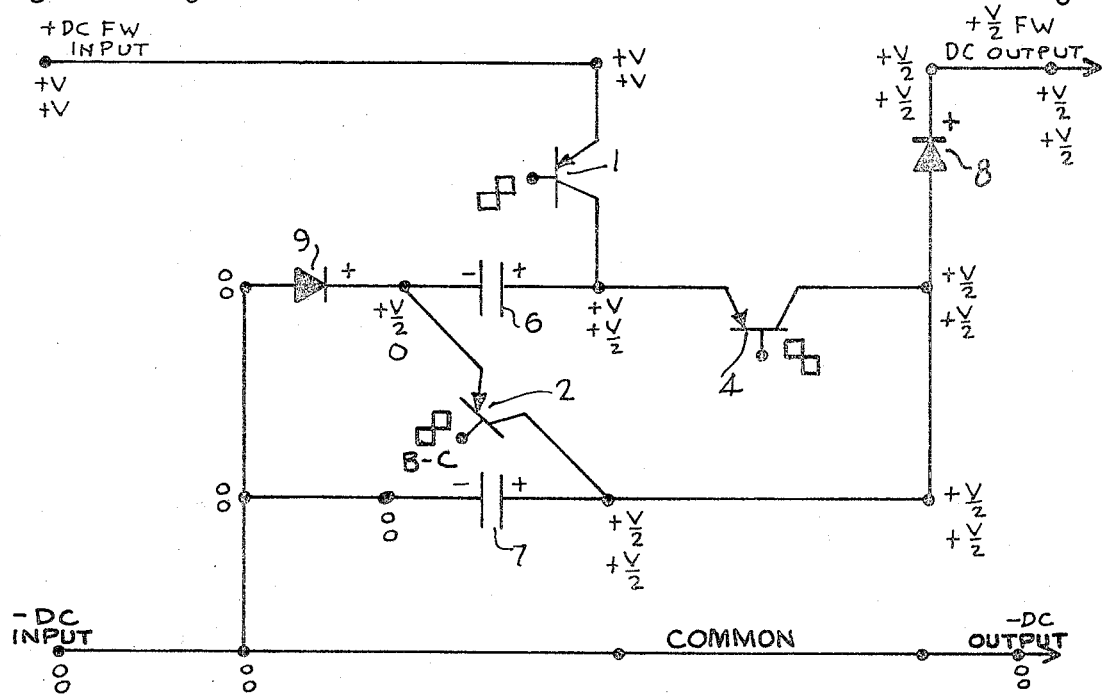

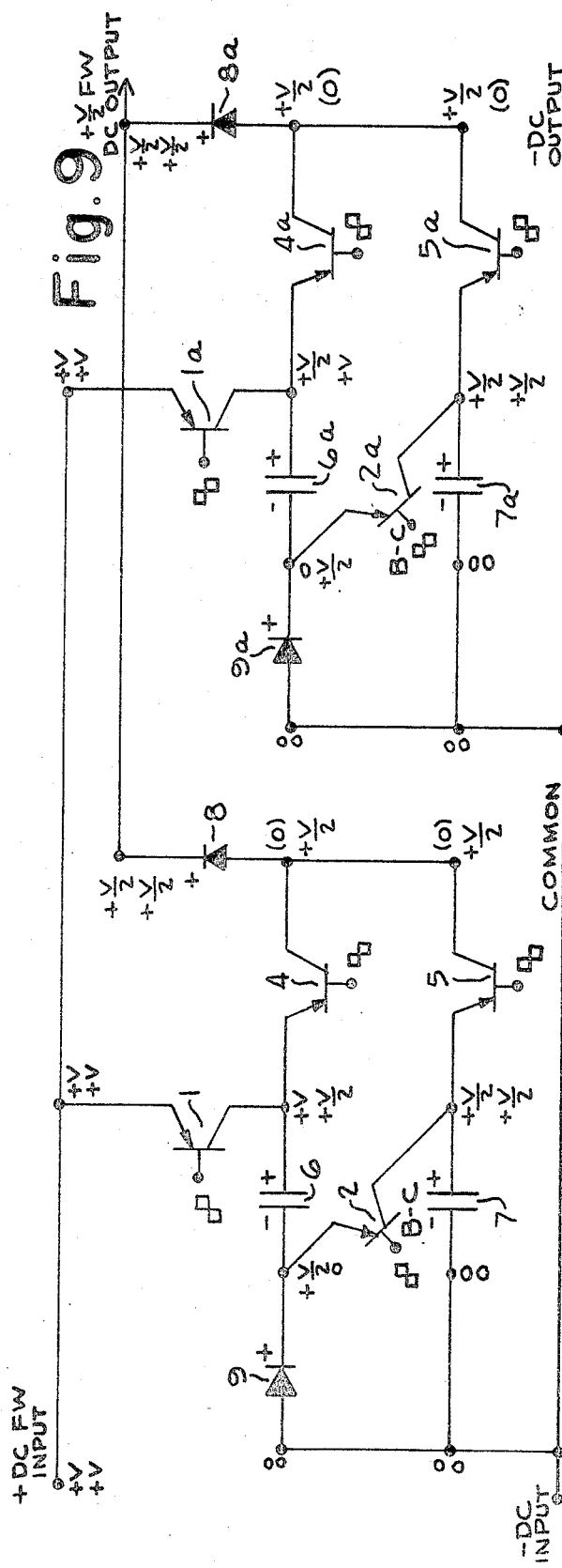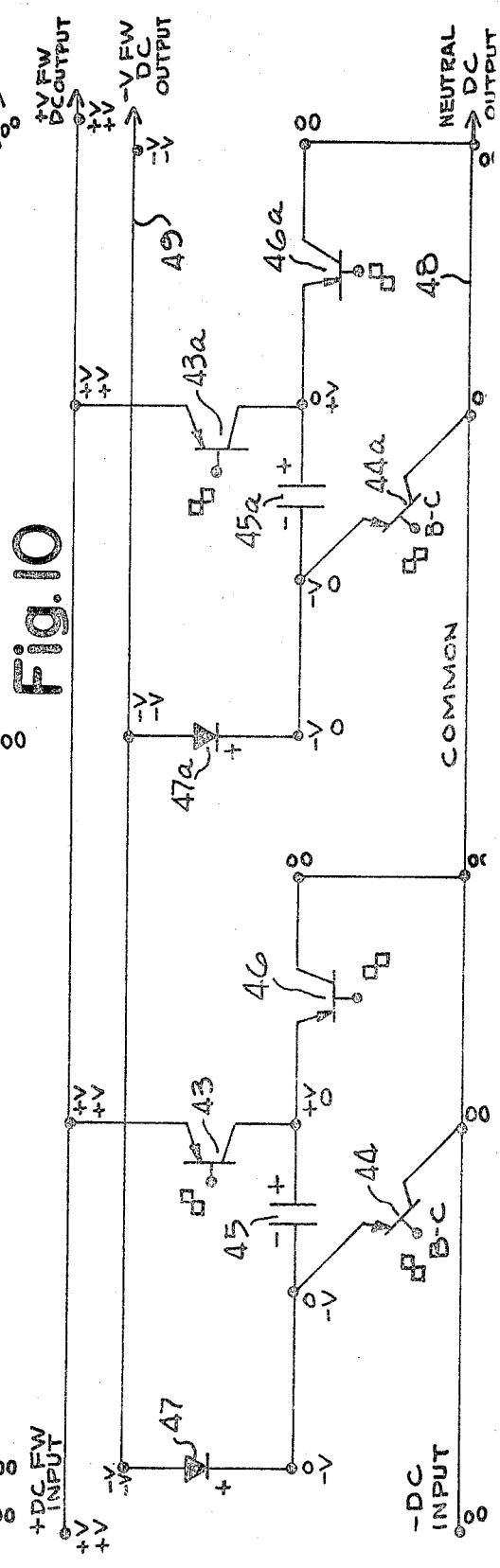

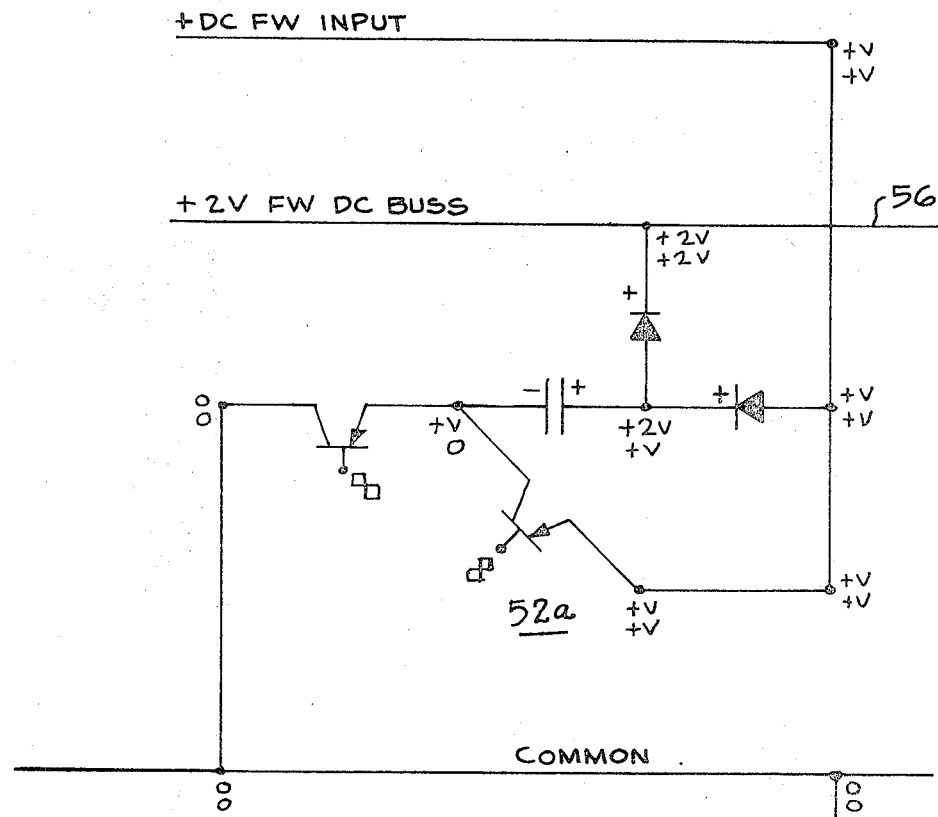
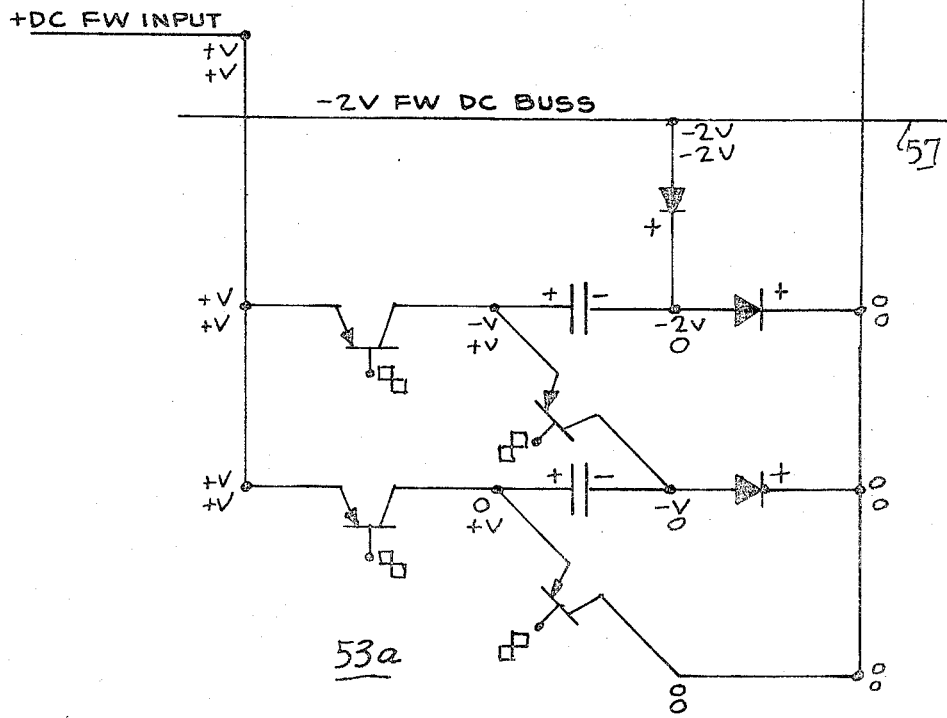
Fig.12b

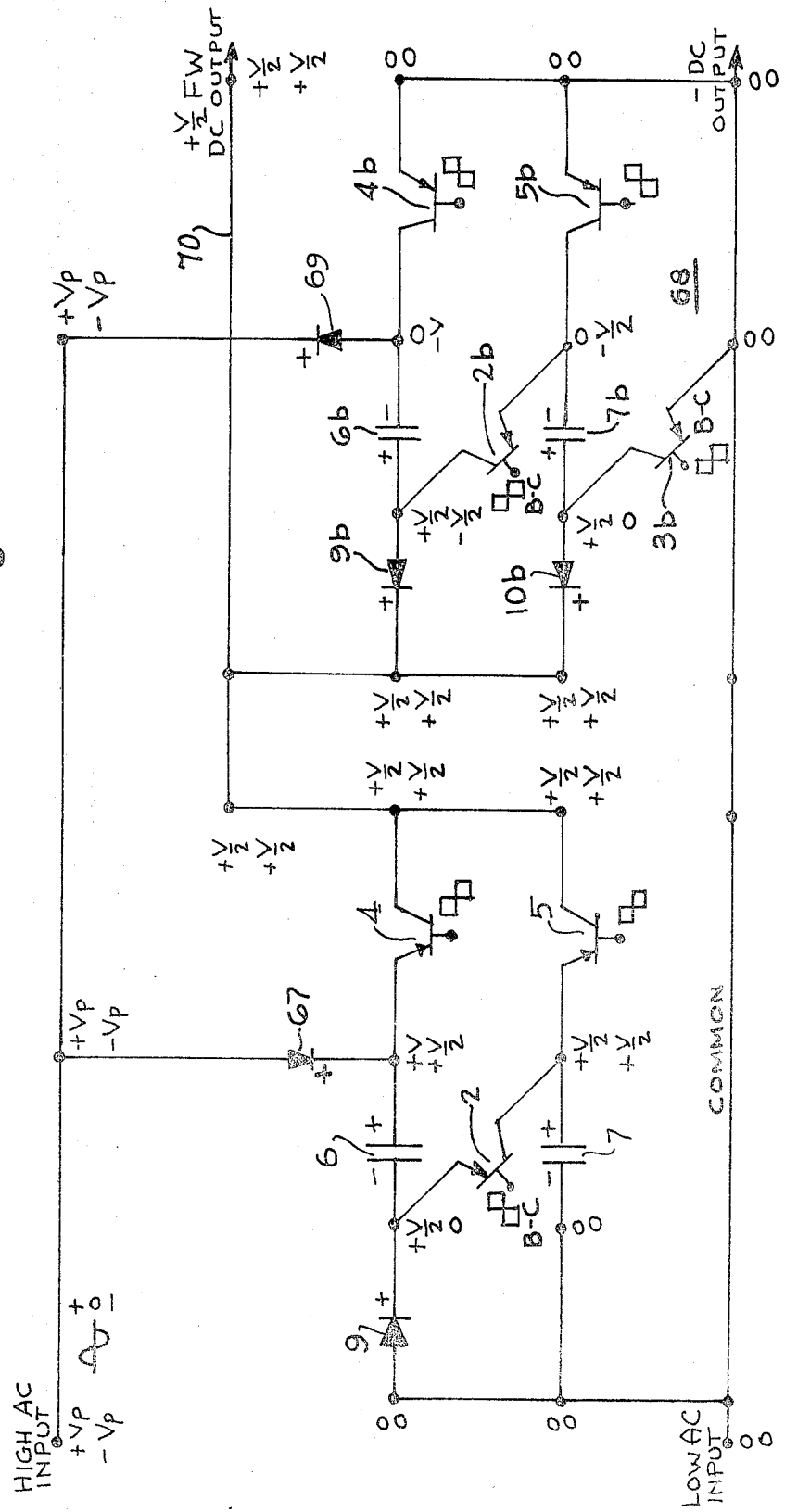

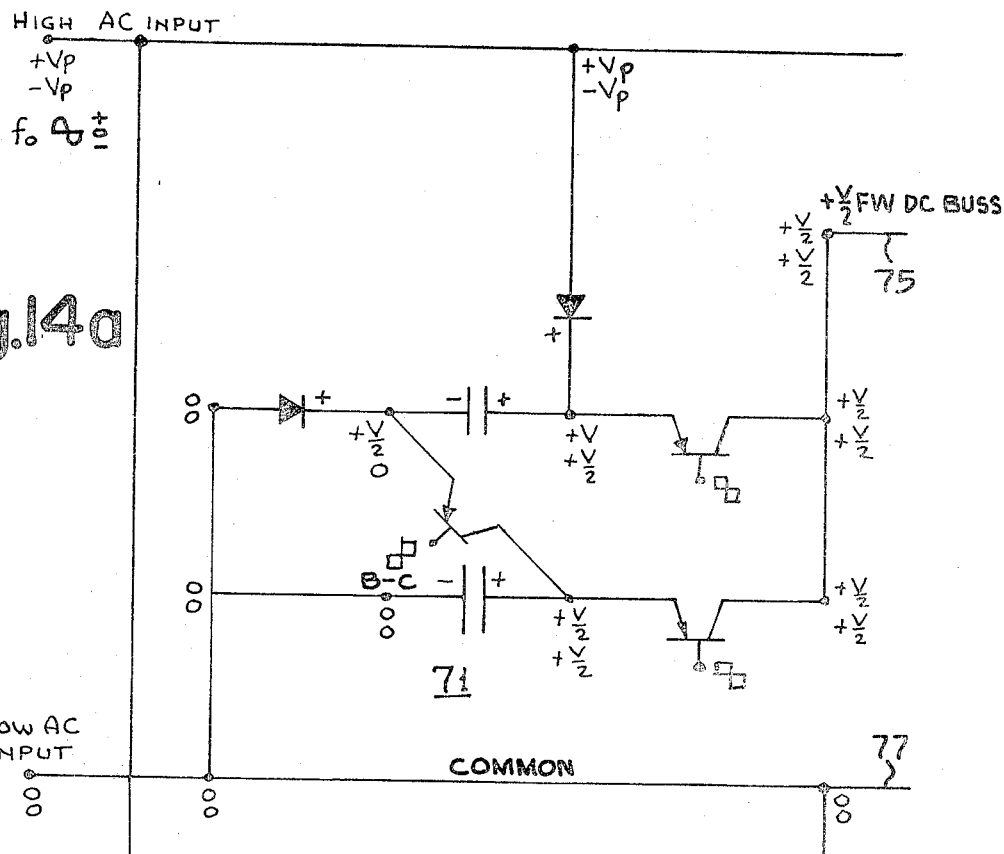
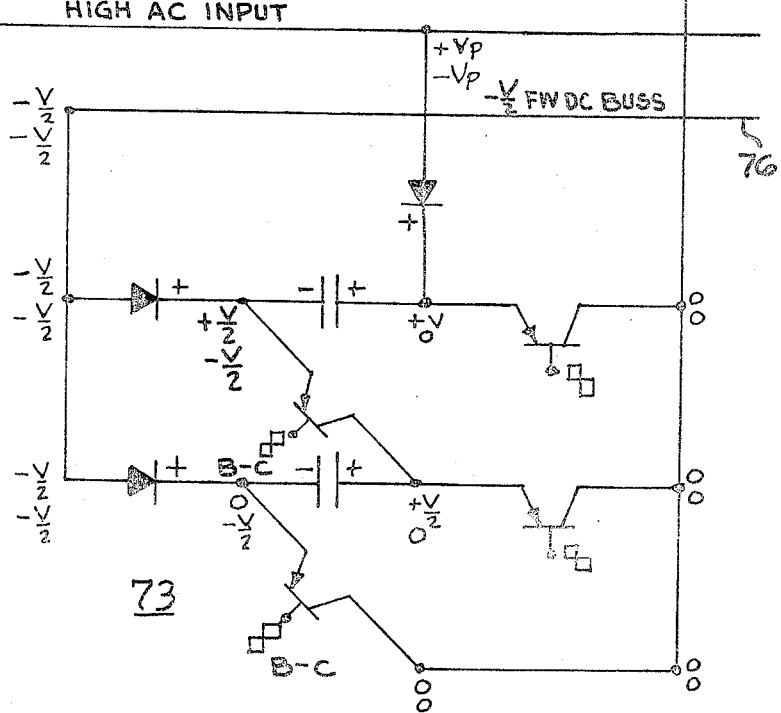
Fig. 14a

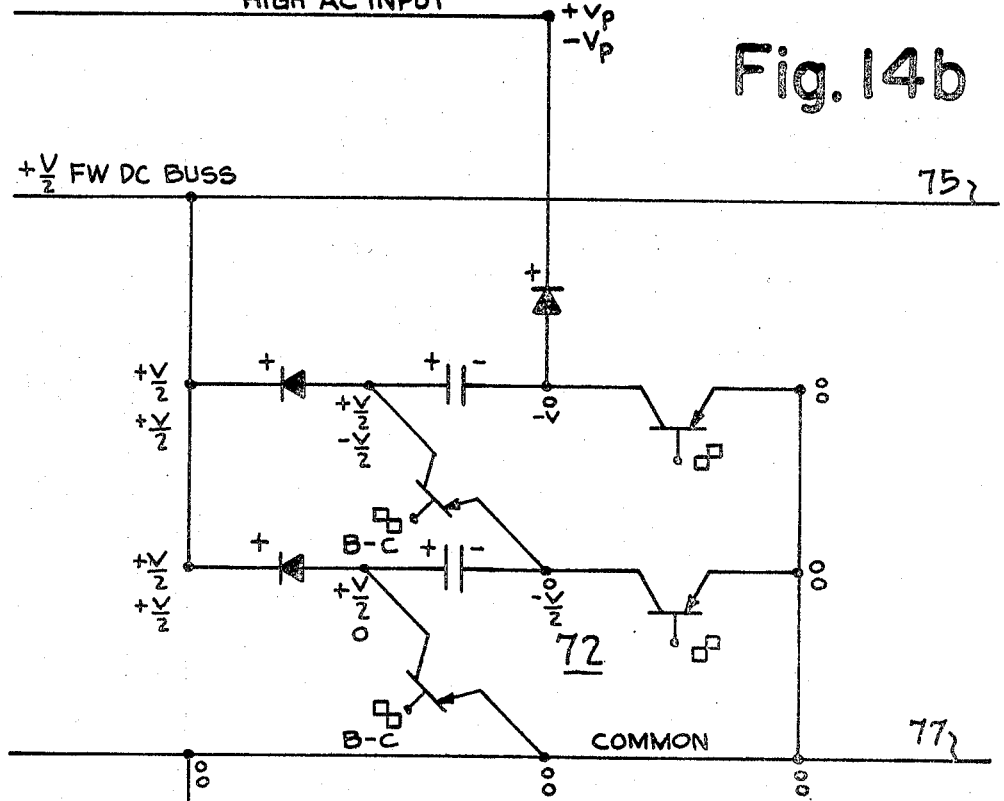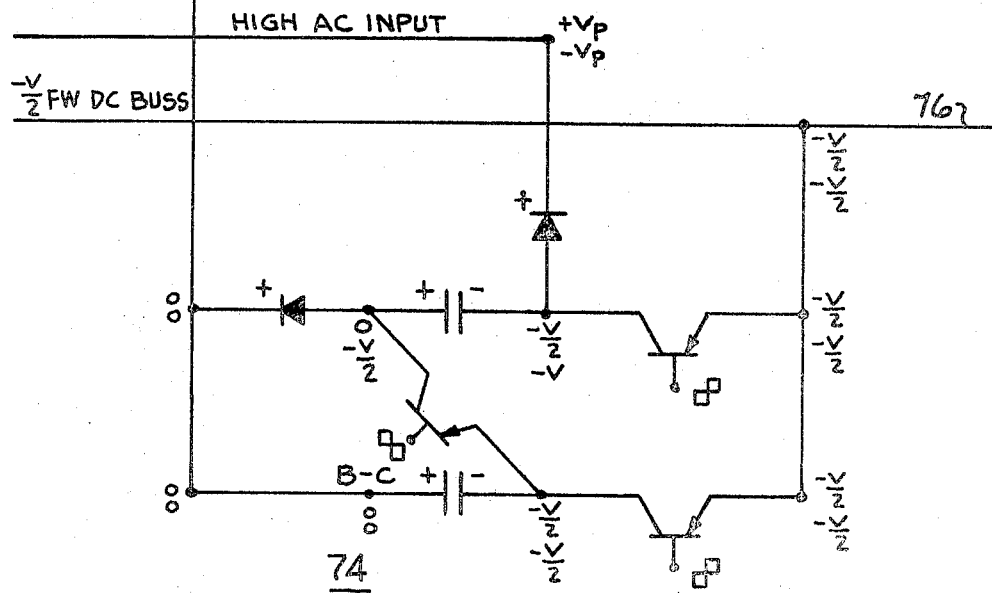
Fig. 14b

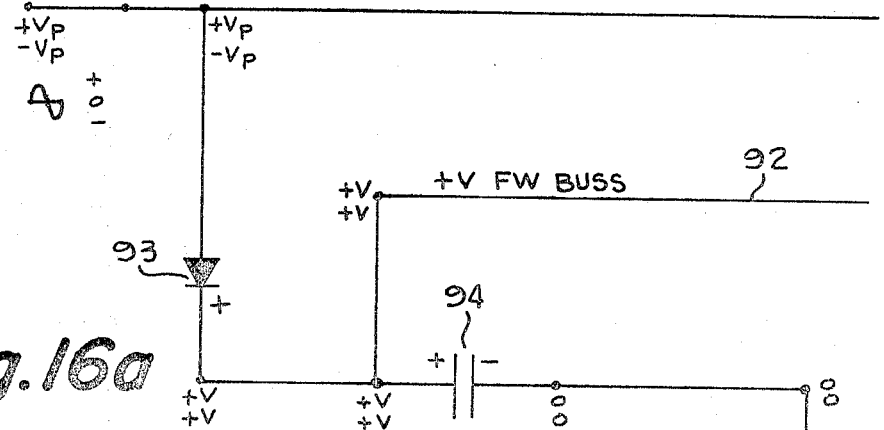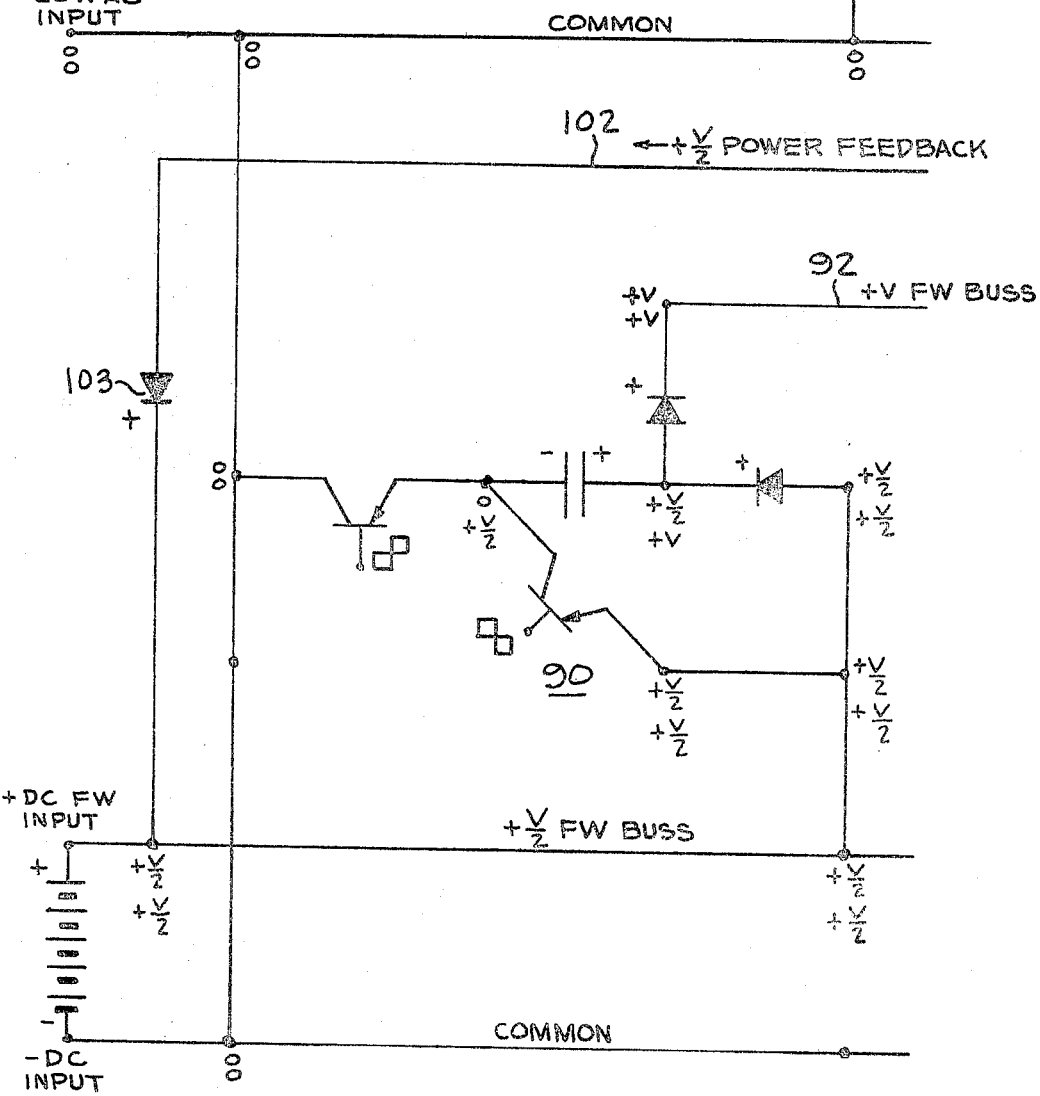
Fig. 16a

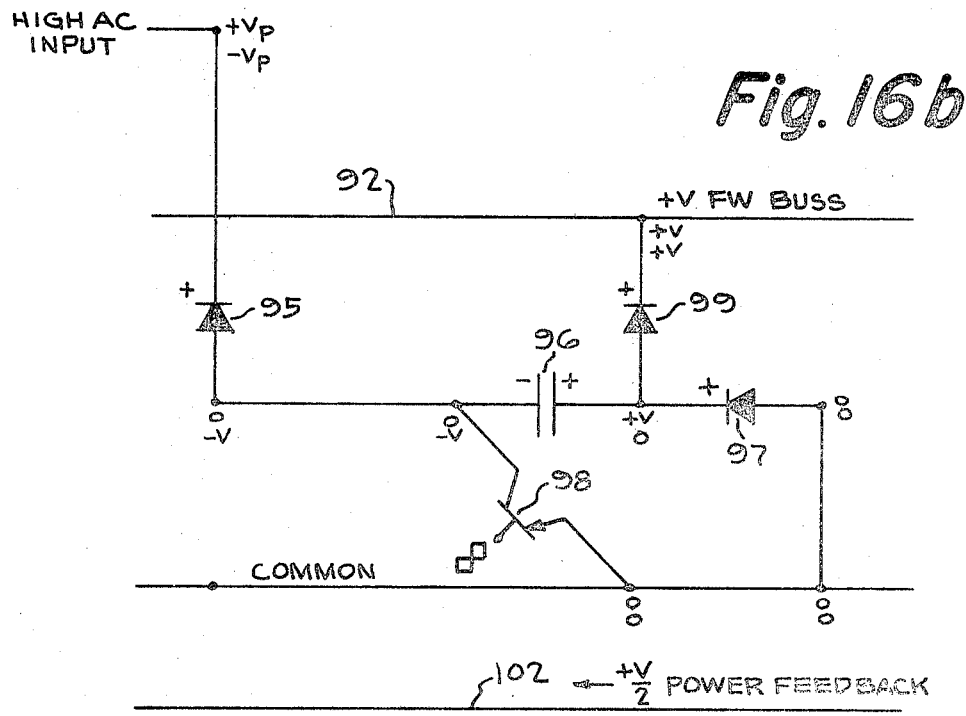
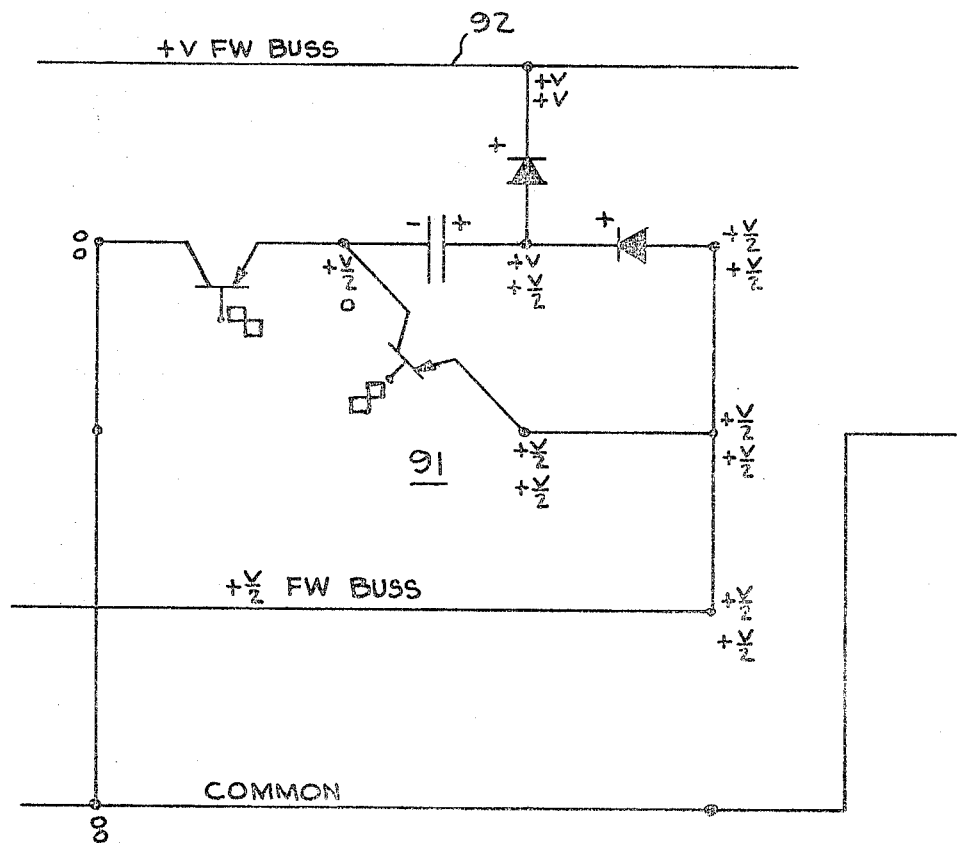
Fig. 16b

1

ELECTRICAL ENERGY CONVERSION BY SWITCHING OF STATIC STORAGE DEVICES

BACKGROUND OF THE INVENTION

Conversion of electrical energy from one form to another has always been attended by a number of problems, including, in part, complexity, economics (equipment cost), efficiency, operational limitations and flexibility of usage. Commonly used forms of electrical energy are those of unipolar voltage (DC) of constant or changing amplitude, and bipolar voltage (AC) of constant or changing amplitude, of a given frequency and reference phase, and of a given number of phases. Conversion solutions have generally utilized a dynamic type of energy storage, i.e., magnetic core transformers and inductances, with associated switching means and rectifying means, for conversions such as DC to DC, DC to AC, AC to DC and AC to AC (frequency or phase change).

Energy storage, however, can be on a static basis, e.g., the electrical charge of a capacitance. An article "Energy Storage Factors," Edward S. Gilfillan, Jr., Electronic Capabilities, Nov. 1963 page 56, discusses the relative merits of various types of energy storage, including electrical energy, and assigns figures of merit to such electrical components as inductances and capacitances, illustrating the superior energy storage capability of capacitance over that of inductance by the three criteria of watt seconds per pound (weight), watt seconds per cubic inch (cubage) and watt seconds per dollar (equipment economics). As indicated in this article, capacitance is one of the most attractive storage devices for electrical energy.

In the prior art, circuits have been proposed for converting electrical energy from one DC form to another DC form by charging capacitors in series and discharging them in parallel, or vice versa. One example of this type of circuitry is shown in the Guggi U.S. Pat. No. 2,773,200.

Prior art circuits using capacitance for electrical energy storage have not been entirely satisfactory for all purposes. In the transformation of electrical energy from either an AC or DC form to another AC or DC form, it is usually desirable and often necessary to provide circuits which can produce not only voltage step-up and stepdown, but also polarity reversal as well. In addition, it is usually desirable and often necessary to provide circuits which can be combined to provide conversions of a more complex nature than, for example, elementary DC to DC conversions. In addition, it is often desirable to provide components, circuits and combinations of circuits, which may be connected in a variety of ways, to provide a variety of types of conversion, thus permitting a single unit, by appropriate connection means, to be multifunctional.

One of the prerequisites for providing polarity reversal is that the basic circuit have a common connection between the input and the output. Prior art circuits have not had this capability, or all of the foregoing capabilities.

In both the foregoing and the following discussions, the word "form" is understood to describe the polarity and voltage of the DC, and the voltage, frequency, phase angle and number of phases of the AC.

DESCRIPTION OF THE DRAWINGS

FIG. 7 shows a circuit for providing a fractional stepdown;

FIG. 8 shows a circuit for performing a full wave stepdown conversion;

FIG. 9 shows a full wave stepdown circuit which draws current from the input source during both half cycles;

FIG. 10 shows a circuit which provides a dual polarity output with respect to a common connection at unity conversion;

FIGS. 12a—12c together show the circuit for a DC to AC three-phase step-up;

FIG. 13 shows a circuit for AC to DC conversion with a stepdown;

FIGS. 14a—14c together show the circuit for AC to AC frequency conversion with a voltage stepdown;

FIGS. 16a—16c show two input sources, one AC and one DC, paralleled in order to complement each other in their supply of AC and DC power to two loads.

SUMMARY OF THE INVENTION

This invention relates to electrical energy conversion systems and more particularly to systems in which electrical storage means are selectively switched between charging and discharging states.

It is an object of the present invention to provide a generic approach for converting electrical energy from one form to another using any relatively static storage means and transferring electrical energy into and out of the storage means by a combination of switching means and rectifying means.

It is a further object of the present invention to provide electrical energy conversions of the type described above in which transistor switch means are connected between the electrical storage means and adapted to connect the electrical storage means in series through the emitter-collector current conduction paths of the transistors.

It is a further object of the present invention to provide electrical energy conversions of the type described above in which a combination of transistor switch means and rectifier means is connected to the electrical storage means and adapted to connect the electrical storage means in parallel through the emitter-collector current conduction paths of the transistors and the anode-cathode current conduction paths of the rectifiers.

It is a further object of the present invention to provide electrical energy conversions of the type described above in circuits which have a common connection between either polarity of the input and either polarity of the output.

It is a further object of the present invention to provide electrical energy conversions of the type described above, in circuits having a common input-output connection, in which the polarity of the output is the reverse of that of the input, both being stated with reference to the common connection.

It is a further object of the present invention to provide electrical energy conversion of the type described above, in circuits having a common input-output connection, which can be combined to provide conversions of a more complex nature, and which also may have their components connected in a variety of ways, to provide a capability of a variety of types of conversion within the single unit.

DESCRIPTION OF PARTICULAR EMBODIMENTS

Figure 1:
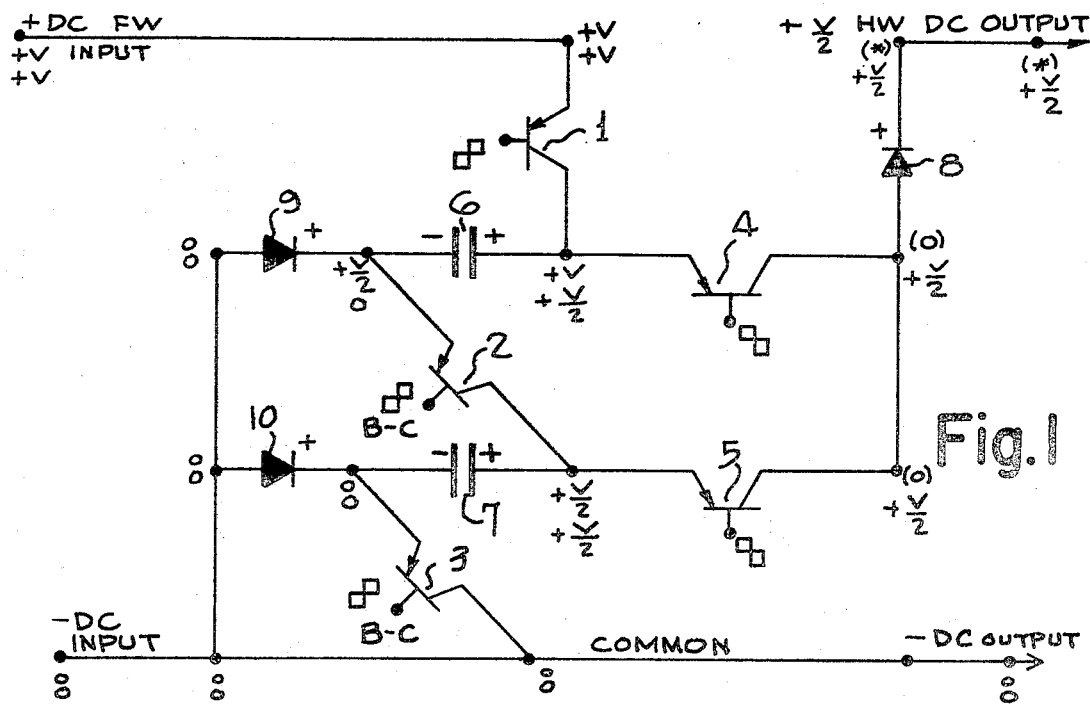
FIG. 1 shows a circuit for DC to DC stepdown.

Referring to FIG. 1, there is shown a circuit for DC to DC conversion. The circuit performs a stepdown, in this case a step down by a factor of two between the input and output.

Before describing the circuit of FIG. 1 in detail, there will first be explained certain notations used throughout the drawings. Refer first to the notation at the base connection of transistor 1. The base voltages of the transistors are derived from a suitable cyclical signal source. The symbol at the base of transistor 1 indicates that a negative voltage is applied to the base of transistor 1 for the first half-cycle and a positive voltage is applied to the base for the second half-cycle. The opposite symbol is also used; that is, a positive voltage on the base is applied for the first half-cycle and a negative voltage is applied for the second half-cycle, as shown, for example, at the base of transistor 4.

Referring to transistor 2, the symbol B—C is included below the base voltage notation. This indicates that the drive voltage is applied between the base and the collector. Where no such notation appears, it is understood that the base drive is applied between the base and the emitter. Since all circuits are shown with PNP type transistors, all transistors with a base voltage notation as indicated for transistor 1, are in the closed, that is, conducting, condition for the first half-cycle and in the open, that is, nonconducting, condition for the second half-cycle. All transistor base drive voltages are synchronously related to each other, unless otherwise noted.

As a further aid to circuit understanding, a voltage notation is used at certain junction points to indicate the approximate voltages during both the first and second half-cycles in terms of the specified input voltage V. The upper notation is the voltage level during the first half-cycle and the lower notation is the voltage level during the second half-cycle. As an example, note that the upper notation at the emitter of transistor 1 is +V and the lower notation is +V. The input voltage applied to the emitter is therefore +V during both the first and second half-cycles. As another example, and at the collector of transistor 1, it will be noted that the voltage +V appears during the first half-cycle and the voltage $\frac{+V}{2}$ appears during the second half-cycle. Also, note that at the collectors of transistors 4 and 5, the upper notation for the first half-cycle is (0). This notation indicates that the voltage is floating, i.e., at a high resistance from its circuit ends, during this time. Note also that the upper notation at the DC output is (*). This indicates that the voltage is determined by the voltage at the output load during the first half-cycle.

Referring to the circuit of FIG. 1, capacitors 6 and 7 are provided for storage of electrical energy. While capacitors are shown, it is possible to use other electrical storage means in these circuits, such as chemical storage cells.

Transistor switch 2 is connected between the capacitors, and together with transistor switches 1 and 3, connect the capacitors 6 and 7 in series with the input voltage during the first half-cycle through the emitter-collector current conduction paths, to charge the capacitors each to a voltage which is approximately one-half of the input voltage.

Transistor switches 4 and 5, together with diodes 9 and 10, connect the capacitors 6 and 7 in parallel through the emitter-collector current conduction paths of the transistors during the second half-cycle. During the second or discharge half-cycle, the load is connected to the capacitors in parallel through diode 8.

Summarizing operation of the circuit of FIG. 1, during the first half-cycle transistors 1, 2 and 3 are conducting and the input voltage is applied to capacitors 6 and 7 in series to charge each of them to one-half of the input voltage. Diodes 9 and 10 are back-biased during the first half-cycle, thereby isolating the capacitors from the —DC input common. Transistors 4 and 5 are cut off during the first half-cycle, thereby isolating the capacitors from the load. Diode 8 is also back-biased, preventing any possible energy feedback from the load back to the circuit.

During the second half-cycle, transistors 1, 2 and 3 are cut off. Transistors 4 and 5 are conducting, and diodes 9 and 10 are forward-biased, thereby connecting the capacitors in parallel and through diode 8 to the load.

It should be particularly noted that there is a common connection between the —DC input voltage and the —DC output voltage. This common connection is not only usually desirable, but also necessary in subsequently described circuits in which there is polarity reversal.

It should be noted that for a voltage stepdown of the type described, it is possible to omit transistor 3 completely, and to omit diode 10, replacing it with a connection. This is the preferred form for performing a voltage stepdown of this type. However, transistor 3 and diode 10 have been shown in FIG. 1 to illustrate the basic similarity between this circuit and subsequently described circuits which will involve polarity reversal.

Finally, in FIG. 1, note that the bases of transistors 2 and 3 have the B—C notation, indicating that the base drive is applied between the base and the collector.

Figure 2:
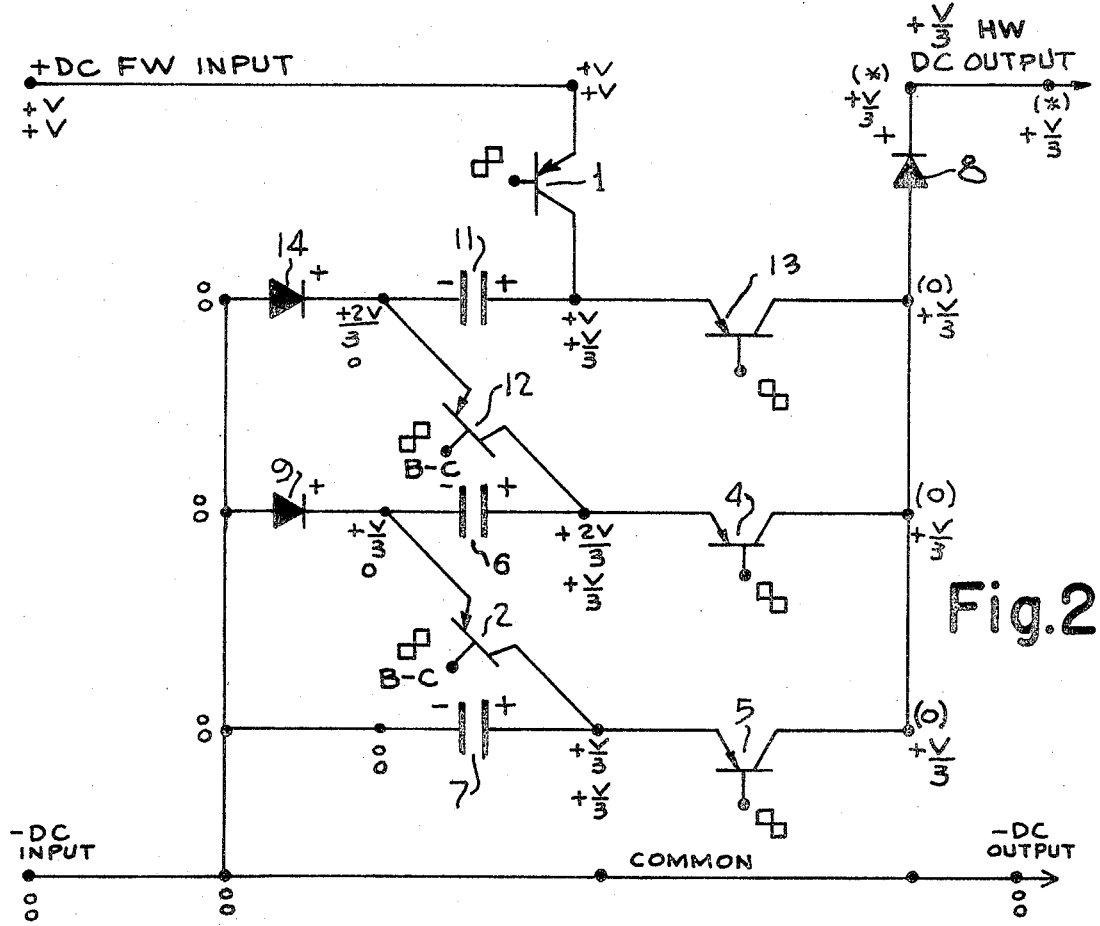
FIG. 2 is a variation of FIG. 1 for performing a voltage step down of one-third.

FIG. 2 is a variation of FIG. 1 for performing a voltage stepdown of one-third, using additional components. Like reference numerals in FIG. 2 have been used to denote like components in FIG. 1. It will be noted that the transistor 3 and diode 10 have been deleted.

Capacitor 11, together with transistor 12 for connecting it in series with capacitors 6 and 7, transistor 13 with diode 14 for connecting capacitor 11 in parallel with capacitors 6 and 7 to the load during the second or discharge half-cycle, have been added. The addition of this stage provides a voltage stepdown of one-third instead of one-half. It will be appreciated that any combination of stages may be used to produce the desired integer stepdown. In both FIGS. 1 and 2, it should be noted that the polarity of the input voltage could be reversed with attendant reversal in output voltage. In this case, the current conduction connections of the transistors and diodes will be reversed, and the polarity of the capacitors will be reversed.

Figure 3:
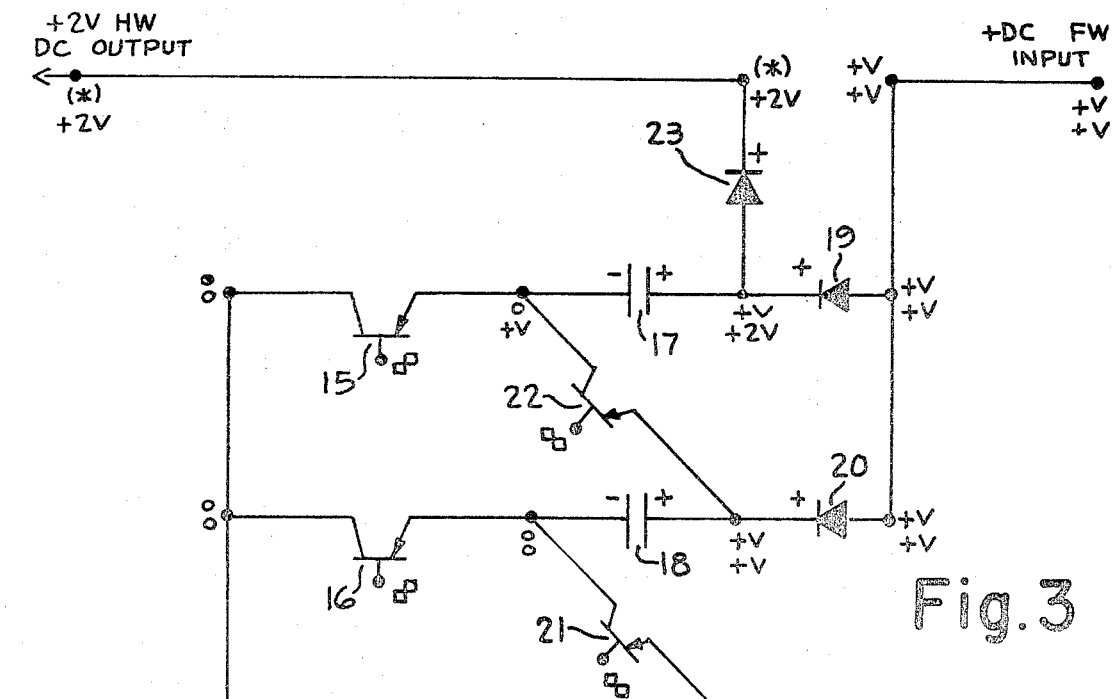
FIG. 3 shows a circuit for DC to DC voltage step-up.

Referring to FIG. 3, there is shown the circuit used for DC to DC voltage step-up to twice the input voltage. In this circuit, transistors 15 and 16, together with forward-biased diodes 19 and 20, are used to connect the capacitors 17 and 18 in parallel with the input voltage during the first half-cycle. Transistors 21 and 22 are cut off, and diode 23 back-biased during the first half-cycle.

During the second half-cycle, transistors 21 and 22 with diode 23 connect the capacitors in series to the load. During discharge in the second half-cycle, transistors 15 and 16 are cut off, and diodes 19 and 20 are back-biased.

In this circuit it is possible to delete capacitor 18, together with switching transistors 16 and 21, and to omit diode 20, replacing it with a connection. The deletion of capacitor 18 in this circuit is possible, still obtaining a voltage step-up of two, because the input voltage +V is connected in series with the voltage on capacitor 17 during the second half-cycle.

Figure 4:
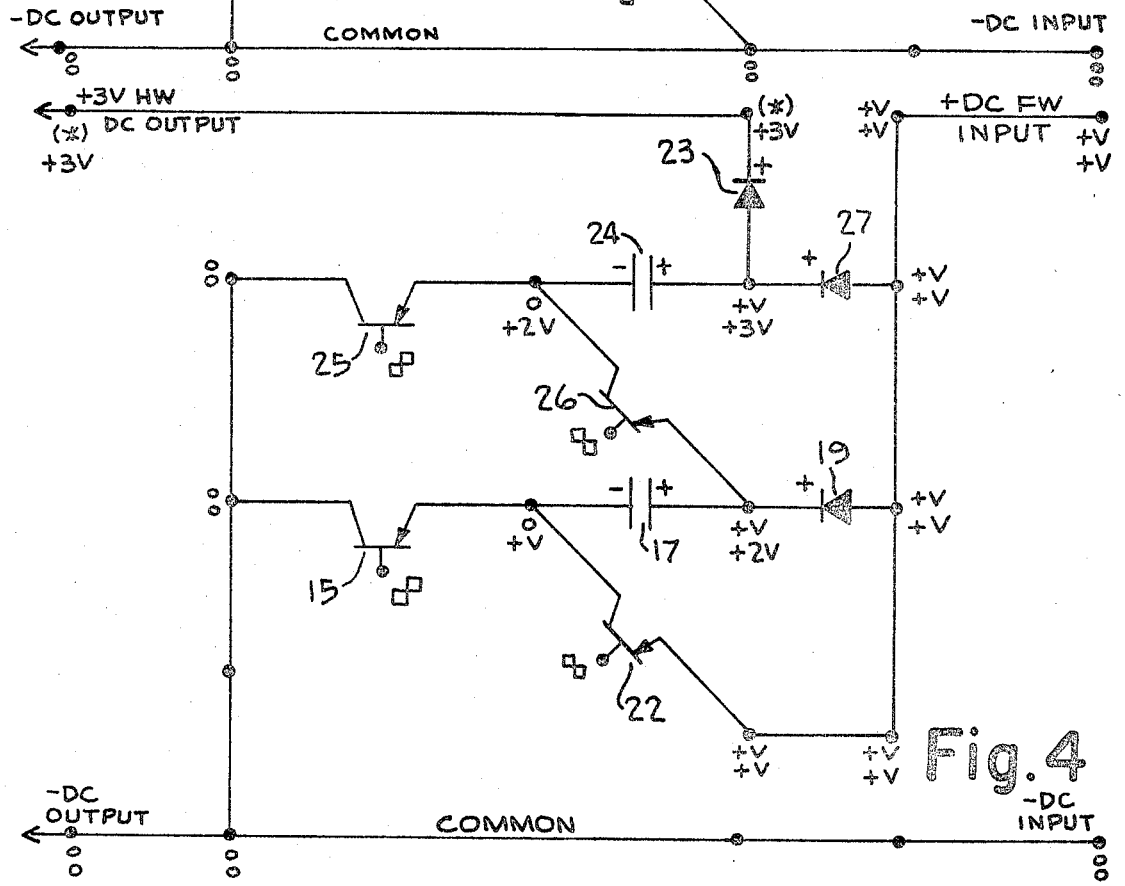
FIG. 4 is a variation of FIG. 3 for performing a voltage step-up of three.

The foregoing modification is used in FIG. 4, which also illustrates the addition of an extra stage to provide a voltage step-up of three between input and output. Like reference numerals denote like components in FIGS. 3 and 4. In FIG. 4, an extra stage including a capacitor 24, switching transistors 25 and 26 and diode 27 have been added. With the additional stage, the output voltage during the second half-cycle is three times the input voltage.

Figure 5:
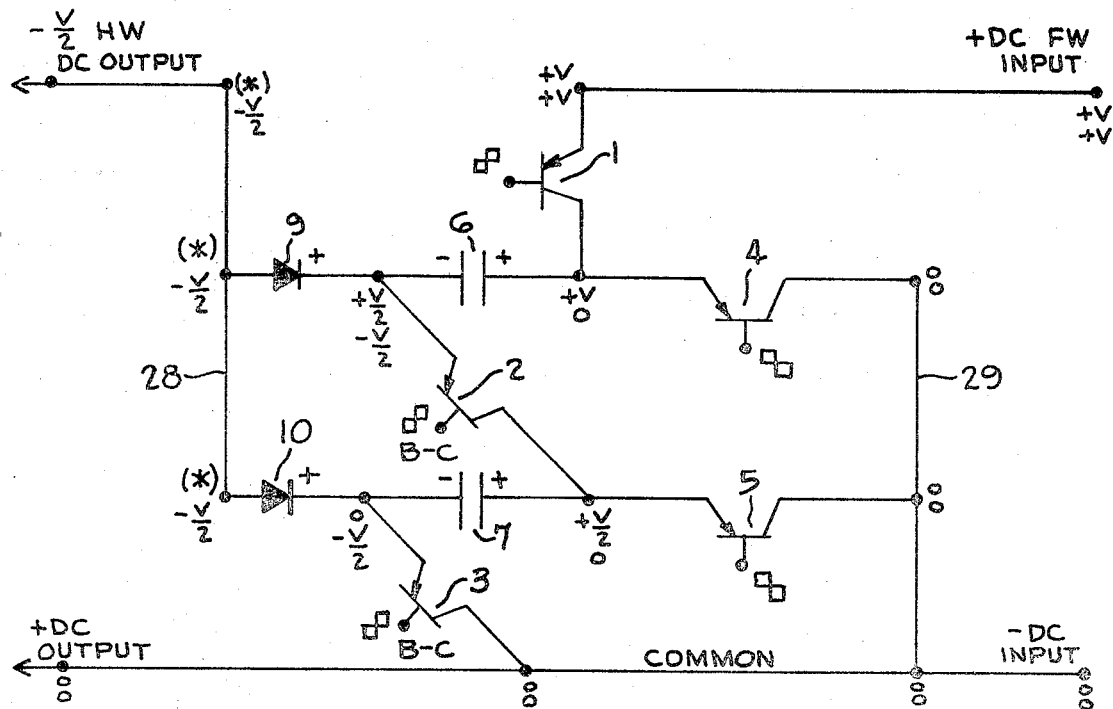
FIG. 5 shows a circuit for reversing polarity between input and output with a stepdown conversion.

Referring to FIG. 5, there is shown the connections for a circuit where it is desired to reverse polarity between input and output. The circuit of FIG. 5 is a stepdown circuit and is the same as the circuit of FIG. 1 in regard to capacitors 6 and 7, transistors 1, 2 and 3 which connect them in series with the input voltage, and transistors 4 and 5, together with diodes 9 and 10, which connect them in parallel and to the output. The differences between FIGS. 1 and 5 are that the output (vertical) buss 28 and the common (vertical) buss 29 of FIG. 5 are interchanged from their positions in FIG. 1, and that the output of FIG. 5 is reversed in polarity from that of FIG. 1, with the output diode 8 deleted in FIG. 5.

Figure 6:
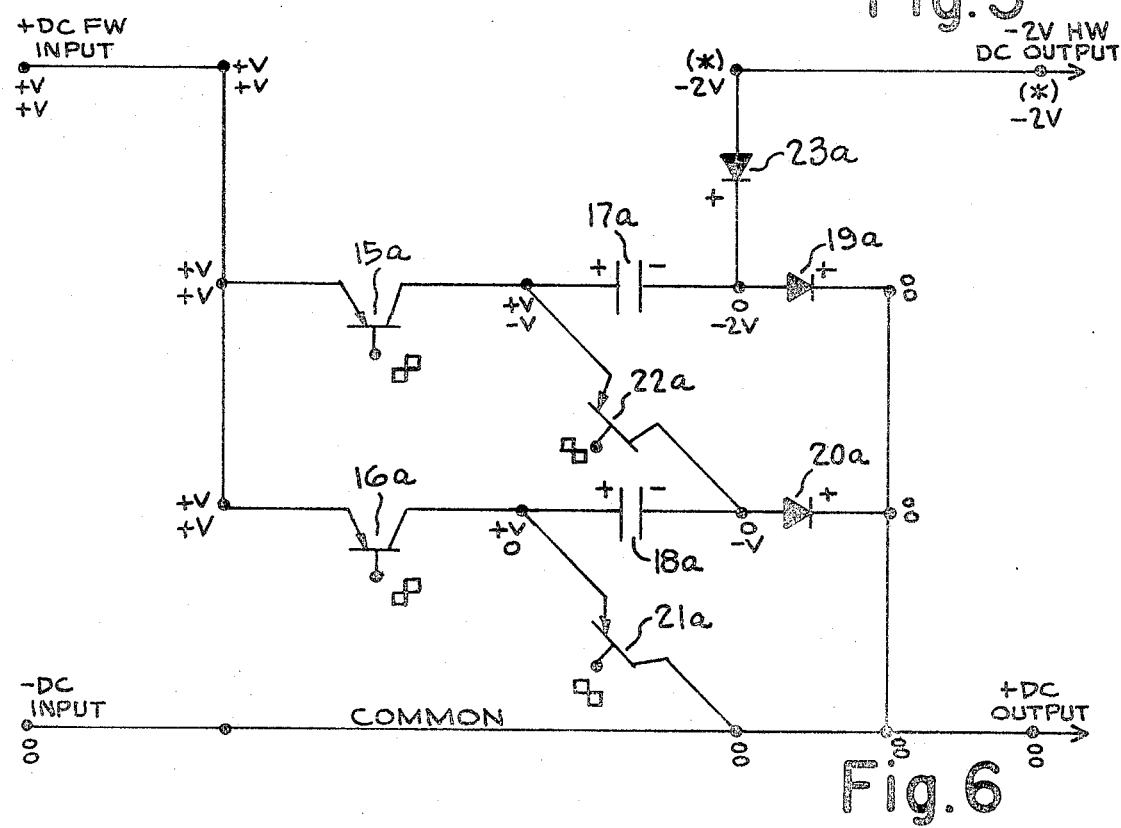
FIG. 6 shows a circuit which performs a step-up conversion and a reversal of polarity.

Referring to FIG. 6, there is shown the connections for the circuit in which it is desired to reverse the polarity between input and output, where the circuit simultaneously performs a step-up conversion by a factor of two. The circuit is the same as FIG. 3, except that current conduction connections of the transistors and diodes have been reversed, i.e., the connections to the emitter and collectors of the transistors have been reversed and the connections to the anodes and cathodes of the diodes have been reversed, and the polarity of the capacitors is reversed. In all other respects components 15a through 23a correspond to components 15 through 23 in FIG. 3. Also, the input (vertical) buss and the common (vertical) buss are interchanged from their positions in FIG. 3. The input voltage is applied to the emitters of transistors 15a and 16a, which are conducting during the first half-cycle and cut off during the second half-cycle.

Referring to FIG. 7, there is shown a circuit for providing a fractional stepdown. The particular circuit shown in FIG. 7 produces an output voltage which is two-thirds of the input voltage. The previously described stepdown circuits were capable of providing only integer stepdowns, that is, one-half, one-third, one-fourth and so on. In FIG. 7, transistor 32 is conducting during the first half-cycle to effect the parallel connection of capacitors 30 and 31 with diodes 35 and 36 forward-biased to complete the parallel connections. This parallel combination in turn is connected in series with capacitor 33 and the input voltage during the first half-cycle. This series connection is effected by the closing of transistors 34 and 42. Since capacitors 30, 31 and 33 all have the same capacity, during the first half-cycle capacitors 30 and 31 in parallel are charged to one-third of the input voltage, and capacitor 33 is charged to two-thirds of the input voltage. Transistors 37, 38 and 39 are cut off, and diodes 40 and 41 are back-biased during the first half-cycle.

During the second half-cycle, transistor 32 is nonconducting and diodes 35 and 36 are back-biased. Transistor 37 is conducting and connects capacitors 30 and 31 in series producing a total voltage of two-thirds the input voltage. This voltage is paralleled with the voltage across capacitor 33 by transistors 38 and 39 conducing during the second half-cycle, with diode 40 forward-biased to complete the parallel connections. These paralleled voltages, which are each two-thirds of the input voltage, are applied through diode 41 to the output. Transistors 34 and 42 are nonconducting during the second half-cycle.

In order to obtain a fractional step-up, for example, five-halves, a similar arrangement is made in which the first two capacitors are connected in series during the first half-cycle, and this series combination connected in parallel with the third capacitor. On discharge, during the second half-cycle, the first two capacitors are connected in parallel and this parallel combination discharged in series with the third capacitor and the input voltage, to produce a total output voltage of five-halves times the input voltage.

It will be appreciated that an alternate method of obtaining fractional stepdowns and step-ups would be the use of sequentially arranged stepdowns and step-ups for example, a step down of two times followed by a step up of five times would produce a five-halves step-up.

FIG. 8 shows a circuit for performing a full wave conversion, that is, the output voltage will be present on the output line during both half-cycles. The particular circuit shown in FIG. 8 is a DC to DC conversion, full wave, stepdown, wherein the output voltage is one-half of the input voltage. The circuit is similar to that shown in FIG. 1, with the exception that certain components have been omitted. Like reference numerals in FIG. 8 have been used to denote like components in FIG. 1. During the first half-cycle, transistors 1 and 2 are conducting, thereby serially connecting capacitors 6 and 7. Both capacitors are charged to a voltage approximately equal to one-half of the input voltage. Simultaneously, the voltage on capacitor 7 is applied to the output line through diode 8. Transistor 4 is cut off and diode 9 is back-biased.

During the second half-cycle, transistors 1 and 2 are cut off. Transistor 4 is conducting, and together with forward-biased diode 9, connects capacitors 6 and 7 in parallel to the output through diode 8. It will be noted that the same output voltage, $\frac{+V}{2}$, is developed during both half-cycles. Transistors 3 and 5 and diode 10 of FIG. 1 are deleted in FIG. 8. It will also be noted that input current is drawn from the input during only the first half-cycle.

FIGS. 1 through 7, previously described, illustrate basic half-wave DC to DC circuits, and FIG. 8 illustrates a basic full wave, stepdown, DC to DC circuit. The remaining circuits to be described are combinations of what has been previously described.

In FIG. 9, there is shown a full wave circuit which draws current from the input during both half-cycles, contrasted to the unbalanced current drain existing in FIG. 8. The first section (left half of the drawing) of the circuit of FIG. 9 is the same as the circuit previously described in conjunction with FIG. 1, except that transistor 3 has been deleted and diode 10 replaced by a connection. Like reference numerals of the first section of FIG. 9 have been used to denote like components of FIG. 1. A second section (right half of the drawing) has been included in FIG. 9. Its circuitry is the same as that of the first section and reference numerals 1a through 9a have been used to designate components corresponding to components 1 through 9 in the first section. The only difference is in operation, in that the second section is alternately driven to charge the capacitors 6a and 7a during the second half-cycle, and to discharge these capacitors to the load during the first half-cycle.

Where it is desired to obtain a dual polarity output with respect to a common connection, a circuit of the type shown in FIG. 10 is used. This type of connection is generally referred to as a three-wire Edison connection, and requires polarity reversal. Polarity reversal is accomplished alternately in the first and second sections of FIG. 10. The first section includes transistors 43 and 44 for connecting capacitor 45 in series with the input voltage during the first half-cycle. Transistor 46 is cut off and diode 47 is back-biased during the first half-cycle. During the second half-cycle, transistor 46 connects the voltage on capacitor 45 to the −DC output line 49 through diode 47. Transistors 43 and 44 are cut off during the second half-cycle.

The second section of FIG. 10 is identical with that of the first section, and reference numerals 43a through 47a have been used to designate components corresponding to components 43 through 47 in the first section. The only difference is in operation, in that the second section is driven alternately to charge capacitor 45a during the second half-cycle, and to discharge this capacitor to the −DC output line 49 through transistors 46a and diode 47a during the first half-cycle. The alternate outputs of the two sections produce a full wave negative output on line 49 with respect to the common neutral line 48.

While the +DC input has been shown connected directly to the +DC output line in FIG. 10, it will be appreciated that similar types of circuits could be used in place of this direct connection. In FIG. 10, the two sections have been shown as providing a unity conversion with polarity reversal. However, it will be appreciated that a step-up or stepdown could be provided in accordance with the principles already taught, for both the plus and minus DC lines.

Figure 11:
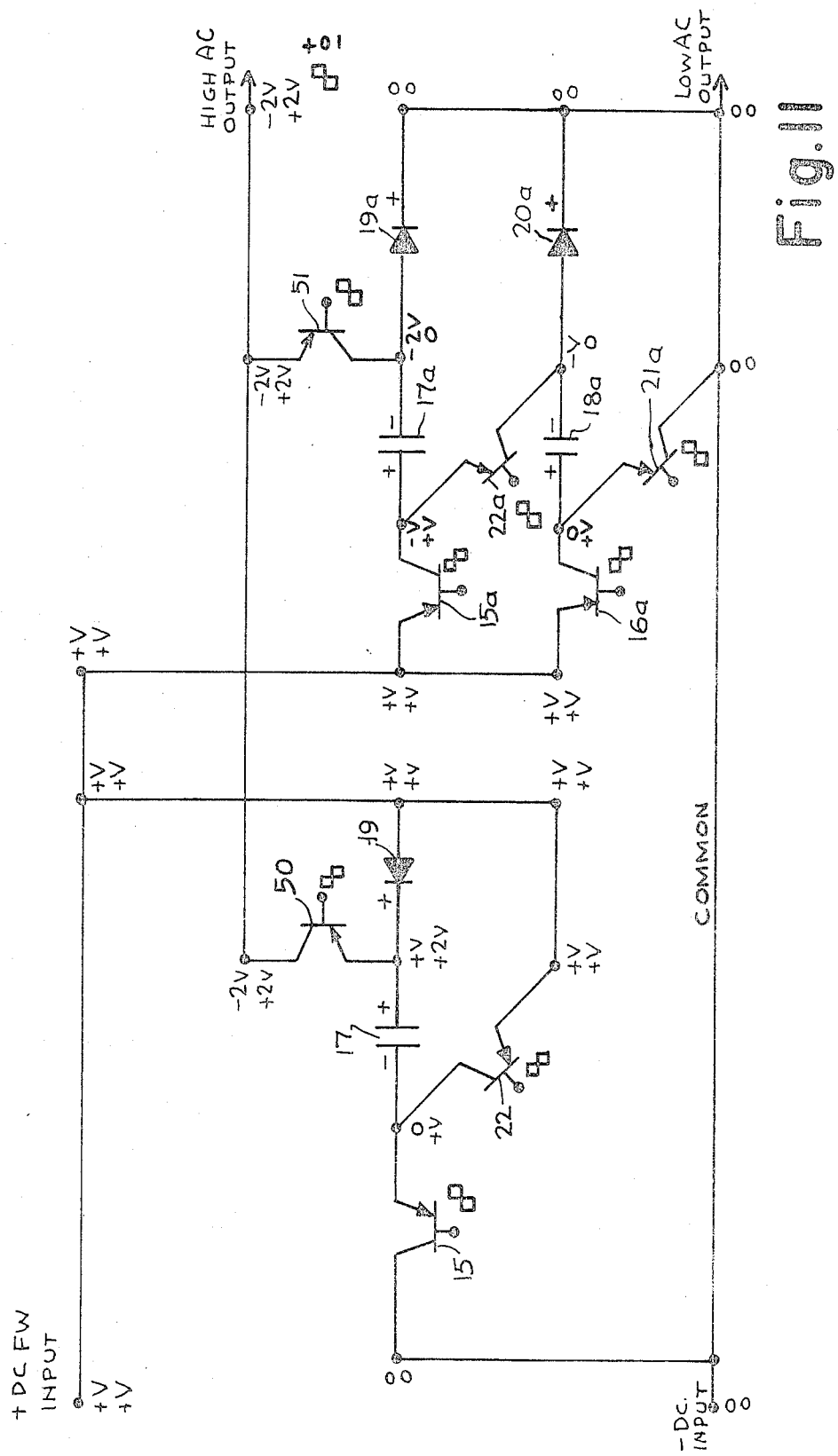
FIG. 11 shows a circuit for converting from DC to AC with a simultaneous voltage step-up.

FIG. 11 shows the combination of two basic DC to DC circuits for obtaining a conversion from DC to AC with a simultaneous step-up. The first section in FIG. 11 is similar to the circuit of FIG. 3, except that transistor 50 replaces diode 23 of FIG. 3, and except that certain unnecessary components have been omitted. Like reference numerals in the first section of FIG. 11 are used to identify like components in FIG. 3. Transistors 16 and 21, diode 20 and capacitor 18 have been deleted in the first section.

The second section of the circuit of FIG. 11 is similar to the circuit of FIG. 6, except that transistor 51 replaces diode 23a of FIG. 6. Like reference numerals in the second section of FIG. 11 have been used to denote like components in FIG. 6. In FIG. 11, the second section is alternately driven with respect to the first section. Transistor 51 connects the second section serially connected capacitors to the output line during the first half-cycle, and transistor 50 connects the first section capacitor to the output line during the second half-cycle. In this manner, −2V is applied to the output line during the first half-cycle, and +2V during the second half-cycle, producing a square wave AC output. Since a −2V voltage is required only during the first half-cycle, and a +2V voltage only during the second half-cycle, half wave DC to DC basic circuits have been used instead of full wave combinations.

Figure 12A:
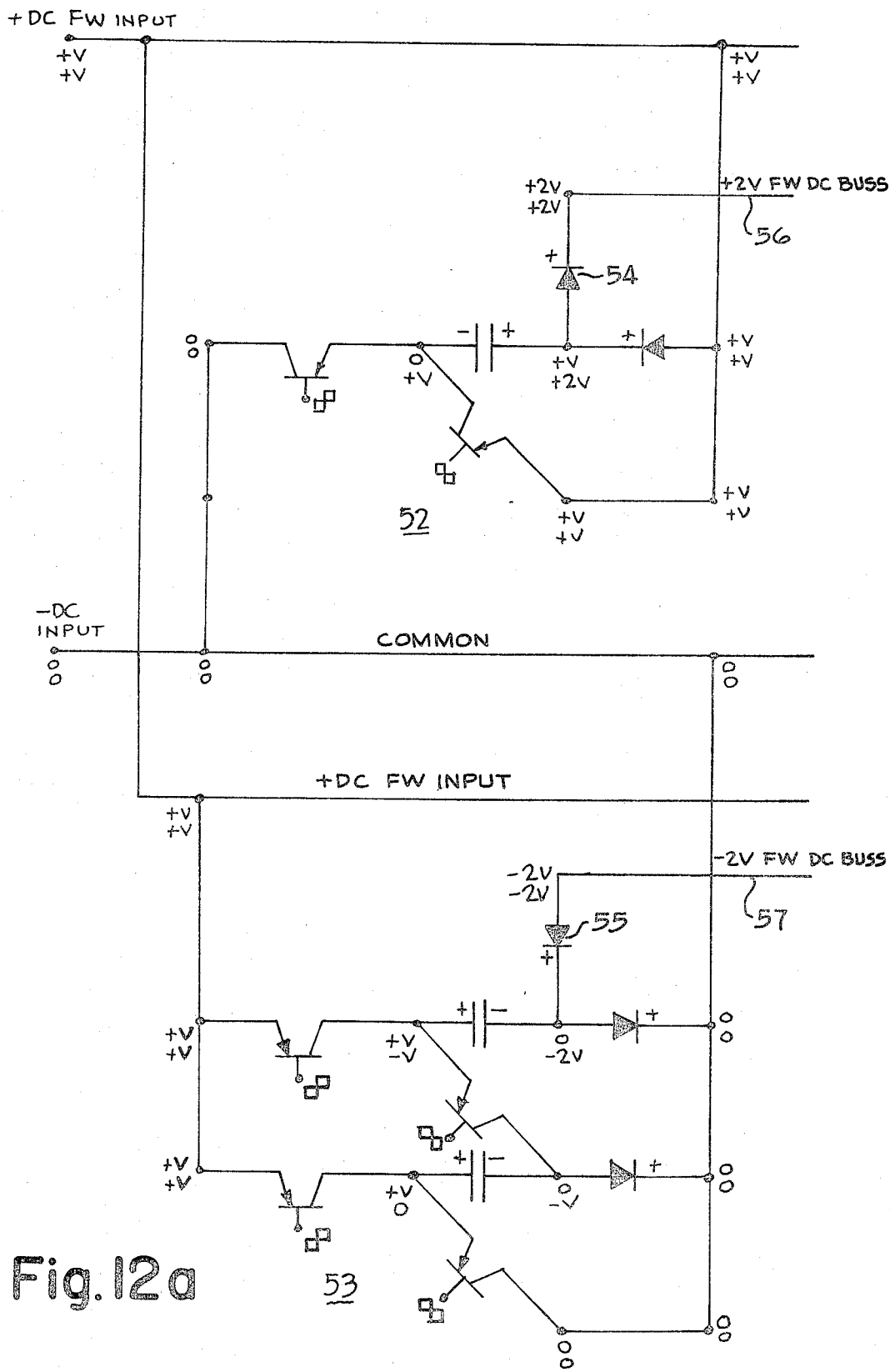
Figure 12C:
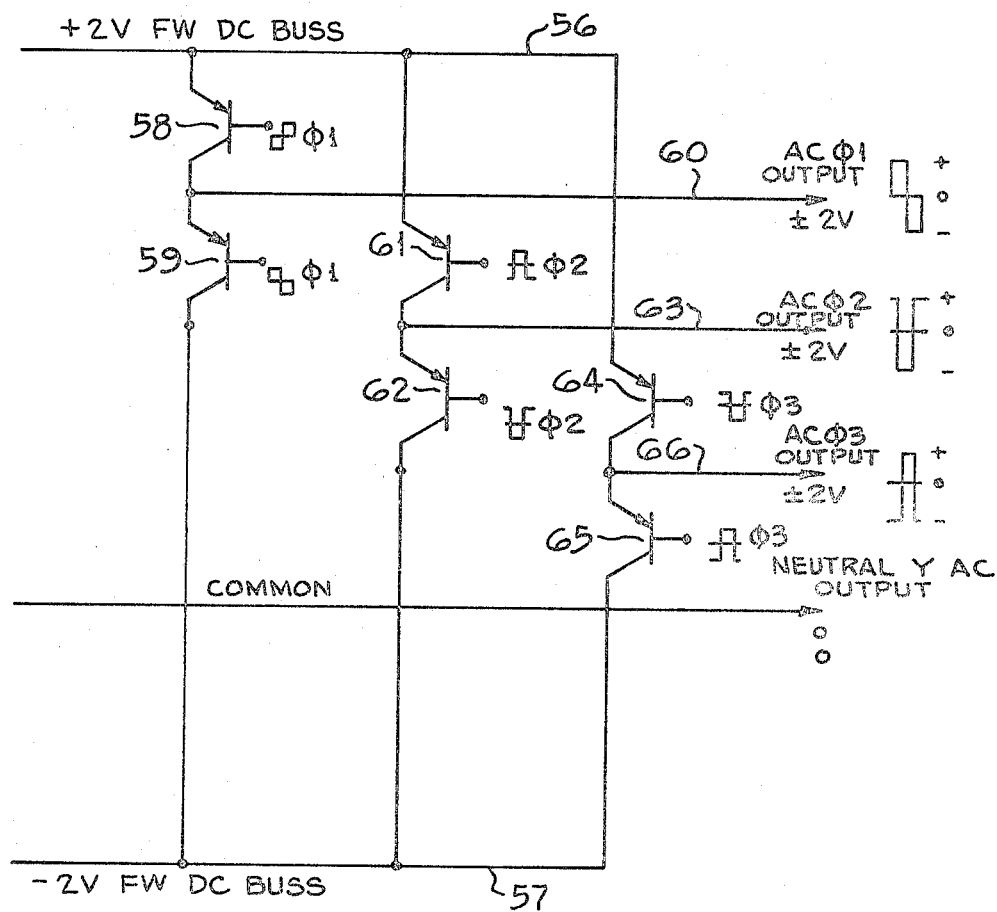
Figure 12D:
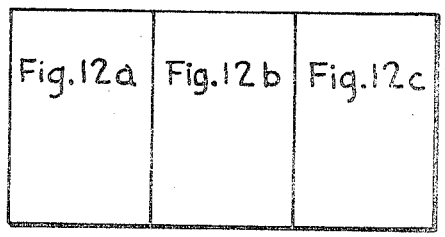
FIG. 12d shows the manner in which FIGS. 12a—12c fit together.

FIG. 12d and its component blocks FIGS. 12a, 12b and 12c show the circuitry for a DC to AC three-phase step-up conversion. In FIG. 12a section 52 is the same as the first section in FIG. 11, except that diode 54 in FIG. 12a replaces transistor 50 in FIG. 11. Section 53 in FIG. 12a is the same as the second section in FIG. 11, except that diode 55 in FIG. 12a replaces transistor 51 in FIG. 11. Charging of the capacitors in sections 52 and 53 of FIG. 12a occurs on the same half-cycle.

Sections 52a and 53a in FIG. 12b are the same respectively as sections 52 and 53, except that they are charged on the alternate half-cycle from sections 52 and 53. Operation of these four sections provides +2V full wave DC on the buss 56 and −2V full wave DC on the buss 57.

In FIG. 12c, the plus and minus 2V voltages are converted to three phase AC by three pairs of switching transistors. Transistor 58 applies +2V to the phase 1 output line 60 during the first half-cycle of the phase 1 transistor base drive. Transistor 59 applies −2V to the phase 1 output line 60 during the second half-cycle of the phase 1 transistor base drive. Similarly, transistors 61 and 62 are alternately conducting during alternate half-cycles to apply +2V and −2V to the phase 2 output line 63. Similarly, transistors 64 and 65 are alternately conducting to apply +2V and −2V to the phase 3 output line 66.

It should be noted that the base drive voltages applied in concert to transistors 58, 59, 61, 62, 64 and 65 are not necessarily related in phase or frequency to the base drive voltages applied to the transistors in the conversion sections 52, 53, 52a and 53a. It is only necessary that the phase 1, phase 2 and phase 3 transistor base drive voltages be related to one another in the proper phase required for the AC outputs, and be of the desired output AC frequency.

It will be apparent that a conversion may be made to a two-phase, or four-phase or higher number of phase outputs if desired.

FIG. 13 shows an AC to DC conversion using circuits of this invention. The first section (left side) is a stepdown type of circuit similar to FIG. 1. Like reference numerals of the first section of FIG. 13 have been used to denote like components in FIG. 1. The input is connected to the circuit through a diode 67 in place of transistor 1 of FIG. 1. Transistor 3 and diodes 8 and 10 are not required and are deleted. Note that it is possible to replace the transistor switch 1 of FIG. 1 with diode 67 in the first section of FIG. 13 because the input is positive only during the first half-cycle; therefore, switching is not necessary. The base drives for transistors 2, 4 and 5 are synchronously related to the AC voltage applied to the input. The output of the first section is applied directly to the full wave DC output buss 70.

A stepdown polarity reversing circuit similar to FIG. 5, but adapted for a negative voltage input, is used for the second section of FIG. 13. Like reference numerals, bearing the suffix "b," are used in the second section of FIG. 13 to denote like components in FIG. 5. All such like reference components of the second section of FIG. 13 are reversed from their corresponding components in FIG. 5. This second section is denoted by the reference numeral 68, and its operation is the same as that described for FIG. 5, but for a negative input voltage. A diode 69 in FIG. 13 replaces the transistor 1 of FIG. 5. Since the input voltage is negative only during the second half-cycle, it is not necessary to switch with a transistor, as the diode 69 performs the same function. The base drives for transistors 2b, 3b, 4b and 5b are synchronously related to the AC voltage applied to the input.

Since the second section 68 produces a polarity reversal of the negative half-cycle of the AC input voltage, and is driven alternately with respect to the first section, a full wave rectification is obtained. That is, the voltage on the output buss 70 is $\frac{+V}{2}$ for both half-cycles.

Figure 14C:
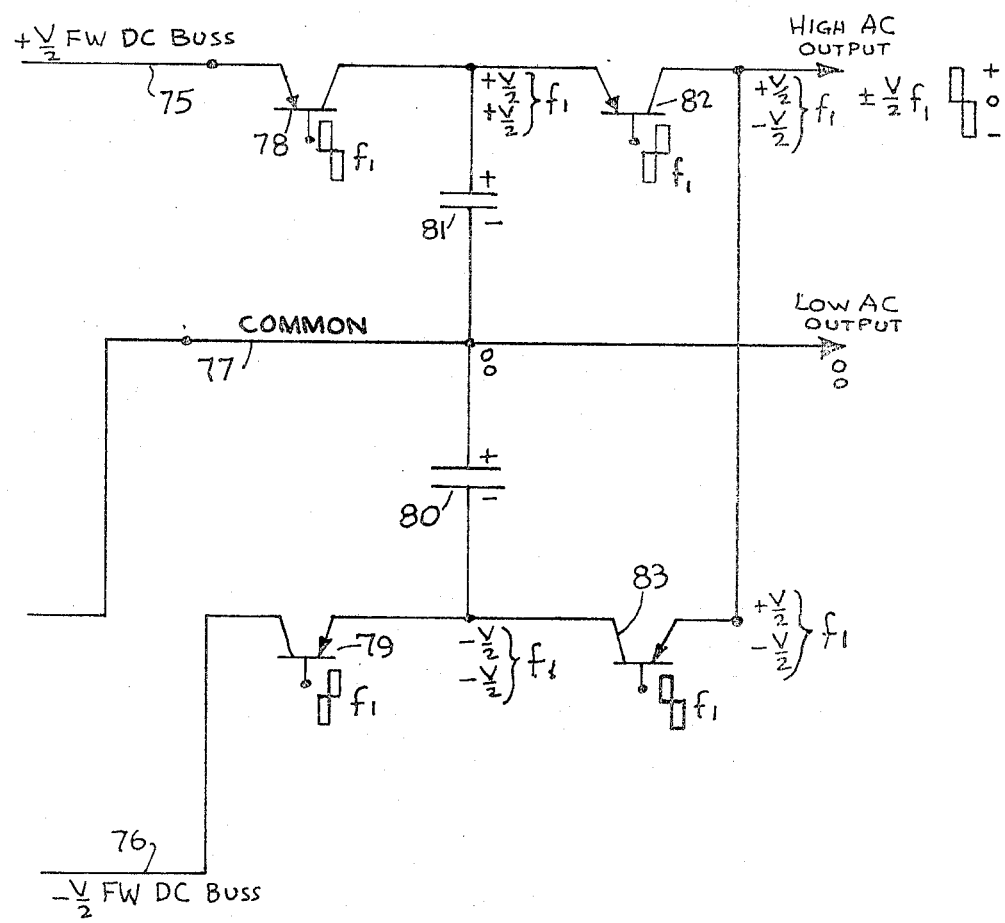
Figure 14D:
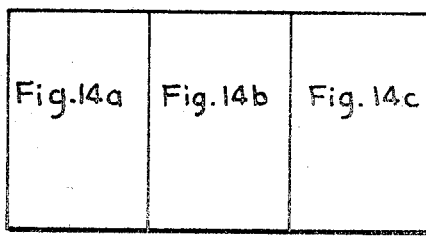
FIG. 14d shows the manner in which FIGS. 14a—14c fit together.

FIG. 14d, and its component blocks FIGS. 14a, 14b and 14c, show circuitry for AC to AC frequency conversion, two-stage stepdown. The AC input is at a frequency $f_o$ and the AC output at a frequency $f_1$, which may be higher or lower than $f_o$. Sections 71 in FIG. 14a and 72 in FIG. 14b correspond to the two sections shown in FIG. 13. Their operation in producing a $\frac{+V}{2}$ full wave DC stepdown output voltage is the same as in FIG. 13. Section 73 in FIG. 14a is similar to section 72 in FIG. 14b, but with all components reversed. Section 74 in FIG. 14b is similar to section 71 in FIG. 14a, but with all components reversed. Section 73 performs a combined polarity reversal and stepdown on the positive half-cycle of the AC input voltage in a manner similar to section 72, but with reversed voltages, while section 74 performs a stepdown only on the negative half-cycle of the AC input voltage in a manner similar to section 71, but with reversed voltages. Operation of sections 71 and 72 produces a $\frac{+V}{2}$ full wave DC output voltage on buss 75, while sections 73 and 74 produce a $\frac{-V}{2}$ full wave DC output voltage on buss 76, both voltages being referenced to a common buss 77. Sections 71—74 all operate with transistor base drives in synchronism with the AC input signal of frequency $f_o$.

Frequency conversion is obtained by operating transistors 78 and 79 in FIG. 14c at the desired output frequency $f_1$. Transistors 78 and 79 are rendered alternately conducting by their base drive voltages. Capacitors 81 and 80 are maintained at substantially constant voltages, $\frac{+V}{2}$ and $\frac{-V}{2}$ respectively, through the alternate conductions of transistors 78 and 79. Transistors 82 and 83 are alternately conducting to apply $\frac{+V}{2}$ and $\frac{-V}{2}$ to the output line on alternate half-cycles. Note that transistor 82 is conducting on alternate half-cycles from transistor 78, so that when capacitor 81 is being charged through conduction of transistor 78, transistor 82 is cut off. Similarly, when capacitor 80 is being charged by conduction of transistor 79, transistor 83 is cut off. In this manner, the output frequency $f_1$ is isolated more effectively from the input frequency $f_o$. This is particularly important where the frequencies $f_1$ and $f_o$ have slightly differing values.

It will be readily appreciated that the circuit of FIG. 14d could be adapted to phase shifting operation, where the output frequency is the same as the input frequency.

Figure 15:
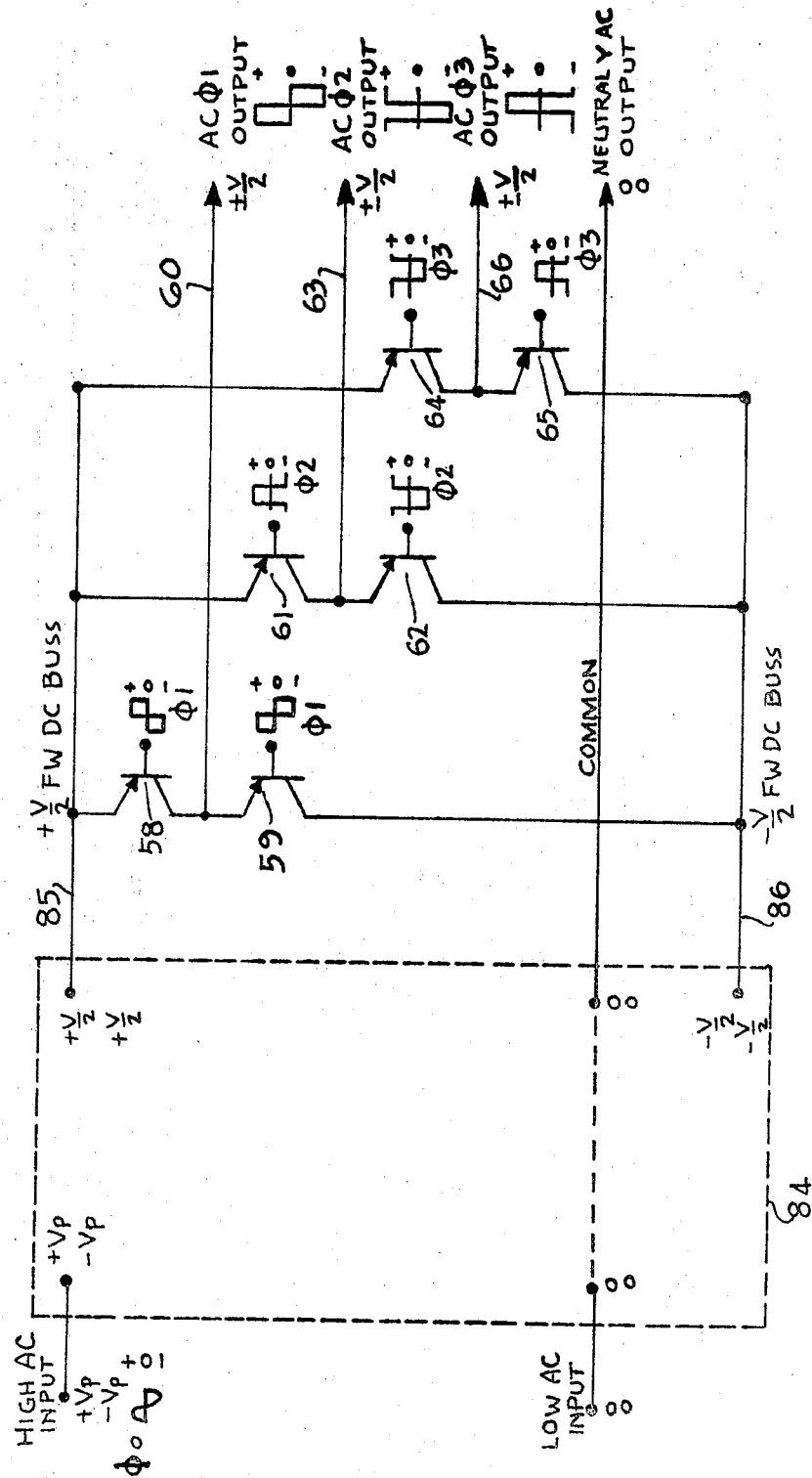
FIG. 15 shows a circuit for AC to AC three-phase conversion, two-stage stepdown.

A circuit for AC to AC three-phase conversion, two-stage stepdown is shown in FIG. 15, wherein block 84 denotes sections 71—74 shown in FIG. 14. The circuit of block 84 produces the voltage $\frac{+V}{2}$ as full wave DC on the buss 85, and $\frac{-V}{2}$ full wave on the buss 86. These two voltages are then converted to a three-phase output in the same manner as previously described with reference to FIG. 12. Reference numerals 58—66 denote like components and busses for both FIGS. 12 and 15. The operation is as described with reference to FIG. 12. It will be apparent that the phase 1 output voltage on line 60 may be related to the phase of the AC input voltage in any desired phase relationship, and that the circuit of FIG. 15 may be readily adapted for a different number of phases in the output, or for a simultaneous frequency or phase changing operation with any number of phases. It will also be apparent that the square wave output of FIG. 15, and other AC output circuits described herein, may be readily converted to sine wave outputs by the usual wave-shaping techniques of filter circuits.

Figure 16C:
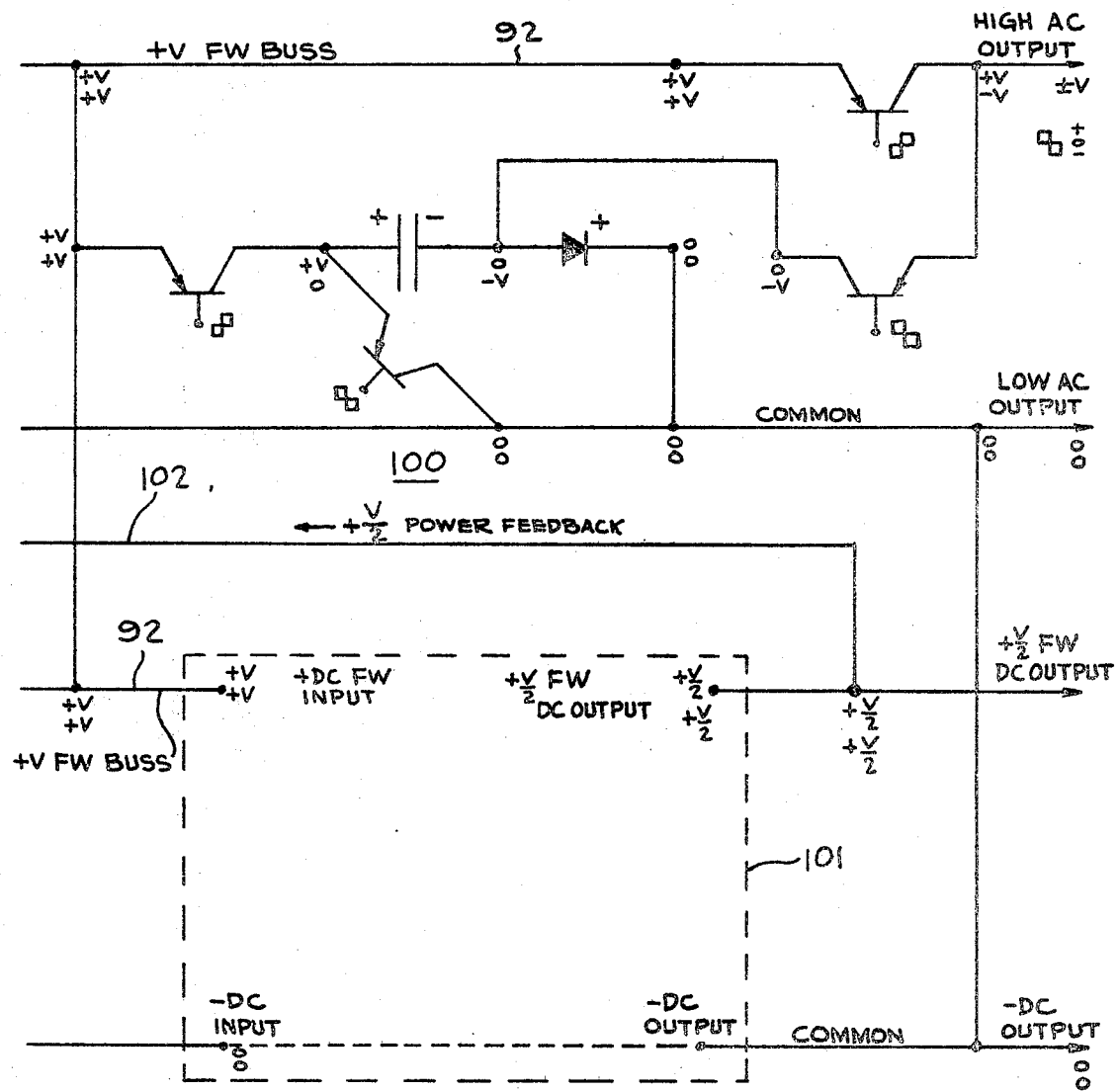

Referring to FIGS. 16a—16c, there is shown the manner in which AC or DC sources may be paralleled in order to complement each other in their supply of power to one or more loads. In these figures, an AC input and a DC input are paralleled, in a complementary manner, to provide an AC output with step up conversion and a DC output with unity conversion.

Section 90 in FIG. 16a is similar to the step-up circuit of FIG. 3 with the modification of deletion of components 16, 18, 20 and 21 in FIG. 3, as previously described in the description of FIG. 3. Section 90 provides a half-wave DC step-up. In FIG. 16b, a similar section 91 is provided to give half-wave DC step-up for the alternate half-cycle. The combination of these two sections produces a full wave +V voltage on buss 92.

The complementary energy source is an AC input voltage also shown in FIG. 16a. The diode 93 and the capacitor 94 perform half-wave rectification and energy storage to provide a voltage of +V on buss 92 during essentially the second half-cycle.

In FIG. 16b and during the second half-cycle, capacitor 96 is charged through diode 95 and diode 97. During the second half-cycle transistor 98 is turned off and diode 99 is back-biased. During the first half-cycle, transistor 98 is conducting and capacitor 96 is discharged through diode 99 to provide a voltage of +V on buss 92. This establishes a full wave voltage of +V on buss 92.

In FIG. 16c, the −V generating portion of section 100 is similar to the right-hand polarity reversing circuit of FIG. 11, with the modification of deletion of components 16a, 18a, 20a and 21a, which changes the step-up operation of FIG. 11 to the unity conversion operation shown in FIG. 16c. Since operation is at unity conversion, the left-hand circuit of FIG. 11 is not required, and the voltage from the +V full-wave buss 92 is used directly. Generation of the square-wave AC plus and minus V voltage on the output is accomplished in the manner of transistors 50 and 51 in FIG. 11, by alternately connecting the plus and minus V voltages to the output. Section 100 thereby provides a DC to square-wave AC unity conversion of ±V, which is essentially the equivalent voltage of the input AC The circuit in block 101 is identical to the circuit of FIG. 9, and provides a DC to DC conversion, two-stage full-wave stepdown, with an output of $\frac{+V}{2}$.

It will be noted that while the DC input and DC output voltages are nominally the same, that there is an intermediate +V full-wave buss 92 between them, powered variously by both the DC and AC inputs, so that the DC output is not necessarily obtained wholly from the DC input. By reason of the intermediate +V full-wave buss 92, it is also true that the AC output is not necessarily obtained wholly from the AC input. If the level of energy in the AC input source is low relative to that of the DC input source, the predominant or total flow of energy to buss 92 will be from the DC input through sections 90 and 91, and thence through section 100 to the AC output and through block 101 to the DC output. Conversely, if the level of energy in the AC input source is high relative to that of the DC input source, the predominant or total flow of energy to buss 92 will be from the AC input through the AC to DC conversion circuits shown in the upper halves of FIGS. 16a and 16b, and then through section 100 to the AC output and through block 101 to the DC output. In this manner the load requirement of buss 92 is shared by the two input sources in accordance with their relative capabilities to supply energy.

In FIGS. 16a—16c, a buss 102 ($\frac{+V}{2}$ Power Feedback) connects the output of block 101 through diode 103 to the DC input source in FIG. 16a, which would normally be designated as a storage battery when the buss 102 is used. When so connected, the storage battery (DC input source) will be in a charging condition except during periods of AC input insufficiency. Use of the buss 102 connection is not an essential part of the paralleling sources circuit, and is shown only as an illustration of one method whereby the DC input source (in this case a storage battery) can be in a charging condition under a normal AC input voltage condition, without the addition of a separate charging unit. Deletion of diode 103 will permit energy to flow in either direction on buss 102, if such an operation is desired.

Figure 16D:
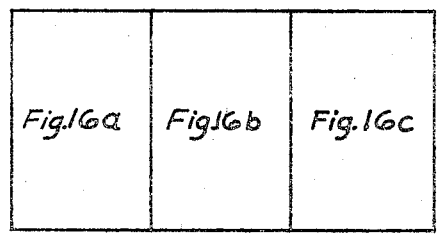
FIG. 16d shows the manner in which FIGS. 16a—16c fit together.

FIG. 16d shows the manner in which FIGS. 16a—16c relate to each other.

While unity conversions have been shown in FIGS. 16a—16c, it will be apparent that combinations of step-up or step-down could be employed. Note that the base drive of transistor 98 in FIG. 16b must be synchronized with the AC input. The base drives for the transistors in section 100 (FIG. 16c) are synchronously related one to the other, and are at the desired output frequency. However, they need not be synchronously related to the AC input frequency. During periods of insufficiency of the AC input, the circuit of section 100 may be driven by a local oscillator. This is a typical requirement of standby power systems. The transistors in circuits 90 and 91 (FIGS. 16a and 16b) are synchronously related one to another and preferably may be driven by the same local oscillator used to drive section 100 during periods of AC input voltage insufficiency.

The base drives for the transistors in block 101 (FIG. 16c) are synchronously related to one another, but again they need not be synchronously related to other base drives. Preferably, they will also be driven by the same local oscillator in the event of an AC source insufficiency.

It will be apparent that other combinations of input sources and other output loads may be utilized in accordance with the teachings of the invention.

The circuits shown in the foregoing FIGS. are typical of the more commonly used ones, and they illustrate the principles by which any type of conversion can be accomplished. Alternate circuits for obtaining higher stepdown or step-up ratios can be obtained by cascading such circuits, preferably full-wave. For example, two three-stage stepdown circuits cascaded will provide a stepdown ratio of 9, whereas the approximate same number of components would supply only a single six-stage circuit.

While specific examples of input and output DC polarities have been shown in the foregoing figures, it will be appreciated that each circuit, with the exception of FIG. 8, can be readily adapted to a simultaneous reversal of both input and output polarities with respect to the common, or to polarity reversal between the input and output with respect to each other, in accordance with the teachings of the invention. The circuit of FIG. 8 cannot accomplish polarity reversal between input and output, but can be arranged for simultaneous reversal of both input and output polarities with respect to the common.

While the applied base-drive voltage waveform is shown "square-wave" as a preference, other waveforms such as sinusoidal might be acceptable under certain conditions.

In general, all base drives having the same phase or differing 180° in phase would have a preferred common source, i.e., one transformer with individual base drive windings on a common magnetic core.

Switches other than the transistors shown, e.g., SCR's, can be used. The NPN type transistor, with appropriate circuit changes, can be used in place of the PNP type shown.

Rectifiers or rectifier circuits, other than the diodes shown, can be used. For example, the base to collector elements of a transistor can be used. Also within the scope of the invention is the use of types of switches (including transistors) capable of being configured by their nature or their connections in the circuit for either the switching or rectifying function, to reduce the number of types of components, and importantly, to permit a minimum number of components to be variously connected in a maximum number of function configurations. As an example, the components in the DC to DC conversion three-stage half-wave step-up circuit of FIG. 4 total two capacitors and seven combination switch-rectifier units, which would be sufficient, when reconnected, to supply the components required in the circuit of FIG. 5, which is a two-stage half-wave stepdown polarity reversing circuit.

The use of a given number of electrical storage devices, switching and rectifying components, or preferably combination switching-rectifying components in connection arrangements to permit this one given number of components to provide a plurality of functions through a corresponding plurality of connection arrangements, provides a single versatile unit capable of meeting the corresponding plurality of requirements.

The positions of the emitter and collector of each transistor can be interchanged in each instance, if the base drive return is also simultaneously interchanged. The phase of the base drive remains unchanged. The positions shown in the figures are the preferred ones, however.

Certain transistor and rectifier connections can be rearranged to obtain a lower voltage or current condition in the circuit.

While particular embodiments of the invention have been shown and described, it will, of course, be understood that various modifications may be made without departing from the principles of the invention. The appended claims are, therefore, intended to cover any such modifications within the true spirit and scope of the invention.

I claim:

1. Apparatus for transforming an input voltage from a voltage source to an output voltage across a load comprising:
   a plurality of electrical storage devices,
   first transistor switch means connected between said electrical storage devices and adapted to connect them in series through the emitter-collector current conduction paths of said first transistor switch means, forming a series combination of said electrical storage devices,
   second transistor switch means and first rectifier means adapted to connect said electrical storage devices in parallel through the emitter-collector current conduction paths of said second transistor switch means and the anode-cathode current conduction paths of said first rectifier means, forming a paralleled combination of said electrical storage devices,
   at least one transistor switch and connections for selectively and alternately coupling the alternately series-paralleled combination of electrical storage devices to said load and said voltage source, and
   means for rendering said first transistor switch means cyclicly conductive in 180° phase relationship with conduction of said second transistor switch means and synchronously conductive with conduction of said transistor switch in said third means.

2. The apparatus recited in claim 1 having a common connection between one terminal of said voltage source and one terminal of said load.

3. The apparatus recited in claim 1 for transforming a DC input voltage of one polarity to a DC output voltage of opposite polarity, with a common connection between one terminal of said voltage source and one terminal of said load, and with at least one transistor switch and connections for selectively and alternately coupling said alternately series-paralleled combination of electrical storage devices to said load and said voltage source in a manner so as to produce said DC output voltage of opposite polarity on the other terminal of said load.

4. The apparatus recited in claim 3 for transforming a DC input voltage to an AC output voltage, further comprising:
   second electrical storage, switching, and rectifying means producing said voltage of one polarity,
   a pair of alternately conducting transistor switches for alternately applying said voltage of one polarity from said second electrical storage means and said voltage of opposite polarity from said first electrical storage devices to said other terminal of said load.

5. The apparatus recited in claim 1 having a common connection between one terminal of said voltage source and one terminal of said load, wherein said input voltage and said output voltage are full wave DC, further comprising:
   a second plurality of electrical storage devices,
   fourth transistor switch means connected between said second electrical storage devices and adapted to connect them in series through the emitter-collector current conduction paths of said fourth transistor switch means, forming a second series combination of electrical storage devices,
   fifth transistor switch means and second rectifier means adapted to connect said second electrical storage devices in parallel through the emitter-collector current conduction paths of said fifth transistor switch means and the anode-cathode current conduction paths of said second rectifier means, forming a second paralleled combination of electrical storage devices,
   at least one further transistor switch and further connections for selectively and alternately coupling the second alternately series-paralleled combination of electrical storage devices to said load and said voltage source, and
   means for rendering said fourth transistor switch means cyclicly conductive in 180° phase relationship with conduction of said fifth transistor switch means and synchronously conductive with conduction of said further transistor switch, and for rendering said fourth transistor switch means conductive in 180° phase relationship with conduction of said first transistor switch means, thereby providing a full wave DC output voltage on the other terminal of said load.

6. The apparatus recited in claim 5 for transforming a DC input voltage to a plurality of phase AC output voltages, said further transistor switch and further connections for selectively and alternately coupling said second alternately series-paralleled combination of electrical storage devices to said load and voltage source in a manner so as to produce said DC output voltage of the same polarity as that of said DC input voltage on said other terminal of said load, and wherein said other terminal of said load is a full wave DC voltage buss of the same polarity as said DC input voltage, said apparatus further comprising:
   third and fourth alternately series-paralleled combinations of electrical storage devices,
   means for selectively and alternately coupling said third and fourth alternately series-paralleled combinations of electrical storage devices to said voltage source and a second load in a manner so as to produce a second DC output voltage of the opposite polarity as that of said DC input voltage on one terminal of said second load, wherein said one terminal of said second load is a full wave DC voltage buss of the opposite polarity as said DC input voltage, and wherein the other terminal of said second load connects to said common connection,
   a plurality of eighth transistor switch pair means with each said pair alternately connecting said full wave DC voltage busses of the same and opposite polarities to each of the plurality of phase AC outputs,
   means for rendering each of said plurality of eighth transistor switch pair means sequentially functional in differing phase relationships, and
   a common connection between said one terminal of said voltage source and the common terminal of said plurality of phase AC outputs.

7. The apparatus recited in claim 1 for transforming an AC input voltage from a voltage source to a full wave DC output voltage across a load,
   a common connection between one terminal of said voltage source and one terminal of said load,
   said third means including at least one transistor switch and connections selectively and alternately coupling said alternately series-paralleled combination of electrical storage devices to said load and voltage source in a manner so that a first DC output voltage on the other terminal of said load is in 180° phase relationship to conduction from said voltage source into said alternately series-paralleled combination of electrical storage devices,
   fourth means including at least one transistor switch and connections selectively and alternately coupling a second alternately series-paralleled combination of electrical storage devices to said voltage source and a second load in a manner so that a second DC output voltage on said other terminal of said load, and having the same polarity as said first DC output voltage, is in 180° phase relationship to conduction from said voltage source into said second alternately series-paralleled combination of electrical storage devices, and means for rendering said transistor switch of said third means cyclicly conductive in 180° phase relationship with conduction of said transistor switch of said fourth means.

8. Apparatus recited in claim 7 for transforming an AC input voltage from a voltage source to a different frequency AC output voltage across a load, said third and fourth means including at least one transistor switch in each of said third and fourth means and connections coupling respectively both of said alternately series-paralleled combinations of electrical storage devices to a first load and said voltage source in a manner so that a first full wave DC output voltage applied to one terminal of said first load is positive with respect to said common connection, fifth and sixth means including at least one transistor switch in each of said fifth and sixth means and connections coupling respectively each of third and fourth alternately series-paralleled combinations of electrical storage devices to a second load and said voltage source in a manner so that a second full wave DC output voltage applied to one terminal of said second load is negative with respect to said common connection, positive and negative full wave DC busses, corresponding respectively to said one terminal of said first and second loads, first transistor switch pair means alternately and respectively connecting each of an electrical storage device pair to said positive and negative full wave DC busses at said different frequency of said AC output voltage, second transistor switch pair means alternately connecting each of said electrical storage device pair to said load at said different frequency of said AC output voltage, and means for rendering a first transistor switch of said first transistor switch pair means conductive in 180° phase relationship with conduction of a second transistor switch of said second transistor switch pair means, wherein said first and second transistor switches are connected jointly to one electrical storage device of said electrical storage device pair.

9. Apparatus for transforming a DC input voltage from a source to a full wave stepped-down DC voltage across a load comprising:

a plurality of electrical storage devices, first transistor switch means connected between said storage devices and adapted to connect them in series through the emitter-collector current conduction paths of said first transistor switch means, forming a series combination of said storage devices, second transistor switch means and first rectifier means adapted to connect said storage devices in parallel through the emitter-collector current conduction paths of said second transistor switch means and the anode-cathode current conduction paths of said first rectifier means, forming a paralleled combination of said storage devices, third transistor switch means coupling one terminal of said series combination of said storage devices to one terminal of said source, with the other terminal of said source connected jointly to one terminal of said load and to the other terminal of said series combination of said storage devices which is also one terminal of said paralleled combination of said storage devices, second rectifier means coupling the other terminal of said paralleled combination of said storage devices to the other terminal of said load, and means for rendering said first transistor switch means cyclicly conductive in 180° phase relationship with conduction of said second transistor switch means and synchronously conductive with conduction of said third transistor switch means.

10. Apparatus for paralleling at least first and second voltage sources to complement each other in the supply of power to a buss supplying at least one load comprising:

a common connection between one terminal of said first voltage source and one terminal of said load, first and second electrical storage means, means for connecting said first voltage source to said first electrical storage means, means for connecting said second voltage source to said second electrical storage means, means for coupling said first and second electrical storage means to a common buss to produce a complementary full wave DC voltage thereon, and third electrical storage means, switching means, and rectifying means, said third electrical storage means, said switching means, and said rectifying means being interconnected to convert said complementary full wave DC voltage on said common buss to the required form of voltage supplied to each load.